US012768562B2

(12) United States Patent
Broker et al.

(10) Patent No.: US 12,768,562 B2
(45) Date of Patent: Oct. 20, 2026

(54) HVAC CONTROL ASSEMBLIES AND CORRESPONDING METHODS OF CONFIGURING PINOUT OF CONNECTORS FOR HVAC CONTROL ASSEMBLIES

(71) Applicant: Copeland Comfort Control LP, St. Louis, MO (US)

(72) Inventors: John F. Broker, Warrenton, MO (US); Thomas E. Blizzard, Imperial, MO (US); John Fidelis Bushur, St. Louis, MO (US); Bryan James Kemp, Brentwood, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 407 days.

(21) Appl. No.: 18/545,331

(22) Filed: Dec. 19, 2023

(65) Prior Publication Data

US 2024/0200820 A1 Jun. 20, 2024

Related U.S. Application Data

(60) Provisional application No. 63/433,995, filed on Dec. 20, 2022.

(51) Int. Cl.
*F24F 11/88* (2018.01)
*G06F 13/40* (2006.01)

(52) U.S. Cl.
CPC ............ *F24F 11/88* (2018.01); *G06F 13/409* (2013.01)

(58) Field of Classification Search
CPC .. F24F 11/88; F24F 11/56; F24F 11/58; F24F 11/63; F24F 11/89; F24F 1/0007; F24F 11/0001; F24F 11/30; F24F 11/46; F24F 11/52; F24F 11/61; F24F 11/66; F24F 11/77; G05B 15/02; G05B 19/042; G05B 19/0421; G05B 19/4183; G05B 19/4184; G05B 19/4185; G05B 19/41855; G05B 2219/2614; G05B 2219/2637; G05B 23/0221; G05B 23/0286; G05B 19/0428; G05B 19/052; G05B 19/054; G05B 19/414; G05B 2219/1103; G05B 2219/1131; G05B 2219/1138; G05B 2219/1159; G05B 2219/1202; G05B 2219/13017; G05B 2219/15011; G05B 2219/15018; G05B 2219/15078; G05B 2219/23422; G05B 2219/24024; G05B 2219/25323; G05B 2219/2624; G05B 2219/2638; G05B 2219/45244; G05B 2219/50168; G05B 23/0216
See application file for complete search history.

(56) References Cited

U.S. PATENT DOCUMENTS 4,609,241 A * 9/1986 Peterson ................ H01R 29/00 439/85
9,013,343 B2 4/2015 Ramachandran
9,014,686 B2 4/2015 Ramachandran et al.
9,531,440 B2 12/2016 Ramachandran et al.
(Continued)

*Primary Examiner* — Paul B Yanchus, III
*Assistant Examiner* — Connor D Cousineau
(74) *Attorney, Agent, or Firm* — Harness, Dickey & Pierce, P.L.C.; Anthony G. Fussner

(57) ABSTRACT

Exemplary embodiments are provided of HVAC control assemblies (e.g., aftermarket universal replacement controls, etc.) and corresponding methods of configuring pinout of connectors for HVAC control assemblies.

20 Claims, 24 Drawing Sheets

One Relay with Two Pairs of Contacts

K4

(56) References Cited

U.S. PATENT DOCUMENTS

| | | | |
|---|---|---|---|
| 9,689,569 | B2 | 6/2017 | Vie |
| 9,714,771 | B1 * | 7/2017 | Goodman ................ F24F 11/64 |
| 9,754,746 | B2 | 9/2017 | Broker et al. |
| 10,571,150 | B2 * | 2/2020 | Vie .......................... F24F 11/89 |
| 11,441,806 | B2 | 9/2022 | Broker et al. |
| 2016/0259313 | A1 * | 9/2016 | Liu ....................... G06F 3/0484 |
| 2021/0325050 | A1 | 10/2021 | Vie |
| 2022/0074618 | A1 | 3/2022 | Broker |
| 2022/0252292 | A1 | 8/2022 | Vie et al. |
| 2022/0299229 | A1 | 9/2022 | Broker et al. |

* cited by examiner

One Relay with One Pair of Contacts

One Relay with Two Pairs of Contacts 1 6-Socket: Nordyne/Nortek Configuration

| # | DESCRIPTION |
|---|---|
| 1 | INDUCER HOT |
| 2 | (OPEN) |
| 3 | IGNITOR HOT |
| 4 | INDUCER NEUTRAL |
| 5 | (OPEN) |
| 6 | IGNITOR NEUTRAL |

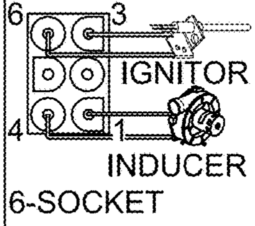

6-Socket: Rheem/Ruud Configuration

| # | DESCRIPTION |
|---|---|
| 1 | IGNITOR HOT |
| 2 | (OPEN) |
| 3 | IGNITOR NEUTRAL |
| 4 | INDUCER HOT |
| 5 | (OPEN) |
| 6 | INDUCER NEUTRAL |

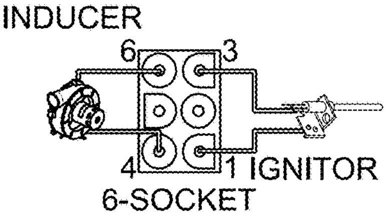

Relay configuration for 6-socket connector E2:

| Pin # | Furnace Side - Harness D | Furnace Side - Harness H | Control Side | | Relay |
|---|---|---|---|---|---|
| | Rheem/Ruud | Nordyne/Nortek | Relay Off | Relay On | |
| 1 | IGN-H | IND-H | IND-H | IGN-H | K9 |
| 2 | NC | NC | NC | NC | - |
| 3 | IND-N | IGN-H | IGN-H | IND-N | K10 |
| 4 | IND-H | IND-N | IND-N | IND-H | K11 |
| 5 | NC | NC | NC | NC | - |
| 6 | IGN-N | IGN-N | IGN-N | IGN-N | - |

2 4-Pin: Goodman/Amana/Trane/American Standard/Lennox/Allied Air/York/Coleman/Luxaire Configuration

| # | DESCRIPTION |
|---|---|
| 1 | INDUCER HOT |
| 2 | IGNITOR HOT |
| 3 | INDUCER NEUTRAL |
| 4 | IGNITOR NEUTRAL |

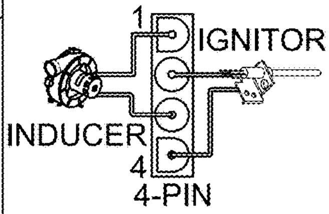

4-Pin: Trane/American Standard Alt. Configuration

| # | DESCRIPTION |
|---|---|
| 1 | IGNITOR HOT |
| 2 | INDUCER HOT |
| 3 | INDUCER NEUTRAL |
| 4 | IGNITOR NEUTRAL |

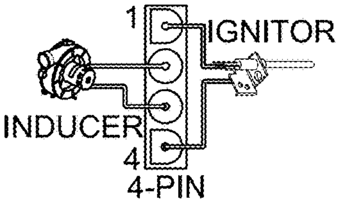

Relay configuration for pin 1&2 of 4-pin connector E25:

| Pin # | Furnace Side - Harness C | Furnace Side - Harness G | Control Side | | Relay |
|---|---|---|---|---|---|
| | | | Relay Off | Relay On | |
| 1 | IGN-H | IND-H | IND-N | IGN-H/ IND-H | K11 |
| 2 | IND-H | IGN-H | IND-H | IGN-H | K9 |

FIG. 4

3 4-Socket: Lennox/Allied Air

| # | DESCRIPTION |
|---|---|
| 1 | INDUCER HOT |
| 2 | IGNITOR HOT |
| 3 | INDUCER NEUTRAL |
| 4 | IGNITOR NEUTRAL |

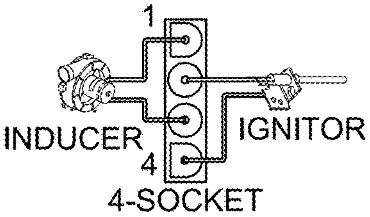

4 2-Pin: Goodman/Amana Configuration

| # | DESCRIPTION |
|---|---|
| 1 | INDUCER HOT |
| 2 | IGNITOR HOT |

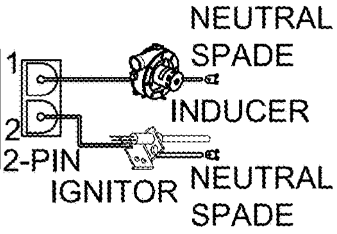

2-Pin: Carrier/Bryant/Payne/ICP Configuration

| # | DESCRIPTION |
|---|---|
| 1 | IGNITOR HOT |
| 2 | INDUCER HOT |

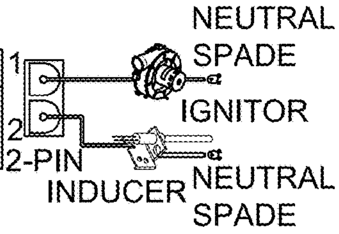

Relay configuration for 2-pin connector E36:

| Pin # | Furnace Side Carrier/Bryant/Payne/ICP | Furnace Side Goodman/Amana | Control Side | | Relay |
|---|---|---|---|---|---|
| | | | Relay Off | Relay On | |
| 1 | IGN-H | IND-H | IND-N | IGN-H/ IND-H | K11 |
| 2 | IND-H | IGN-H | IND-H | IGN-H | K9 |

5 6-Pin Inline: Trane/American Standard

| # | DESCRIPTION |
|---|---|
| 1 | TAP 1 |
| 2 | TAP 2 |
| 3 | TAP 3 |
| 4 | TAP 4 |
| 5 | TAP 5 |
| 6 | GND |

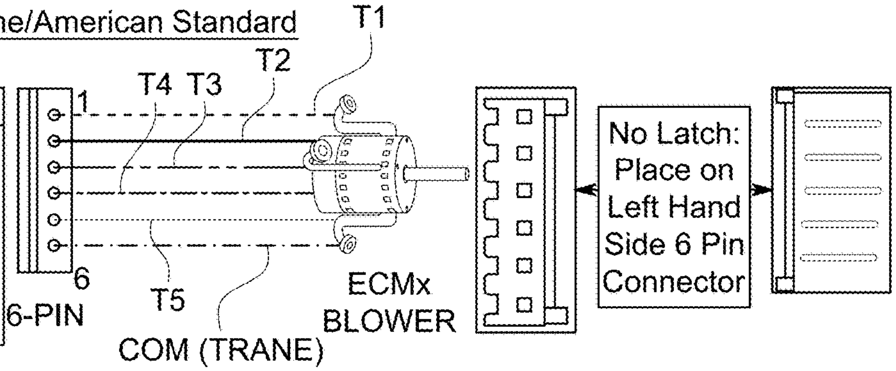

6 6-Pin Inline: Goodman/Amana

| # | DESCRIPTION |
|---|---|
| 1 | GND |
| 2 | TAP 5 |
| 3 | TAP 4 |
| 4 | TAP 3 |
| 5 | TAP 2 |
| 6 | TAP 1 |

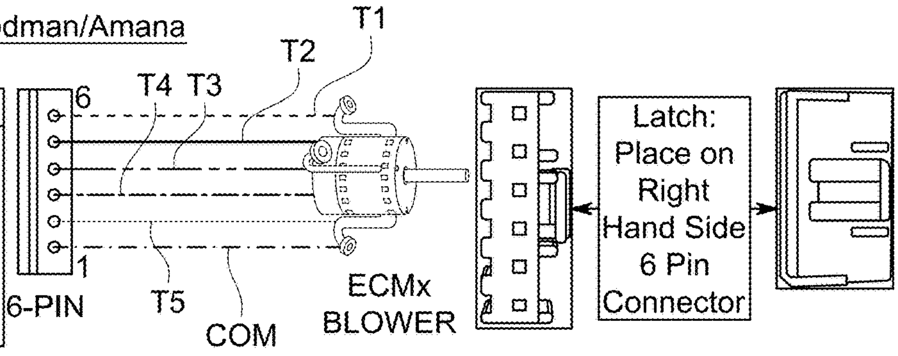

FIG. 5

A

Relay configuration for 9-socket connector E1:

| Pin # | Furnace Side - Harness A | | Furnace Side - Harness B | Control Side | | Relay |
|---|---|---|---|---|---|---|
| | Goodman 1 | Goodman 2 | Nordyne/Nortek/Rheem/Ruud | Relay Off | Relay On | |
| 1 | NC | Jumper to Pin 4 | NC | E1.1-S | E1.1-S | - |
| 2 | PSO | PSO | MV COM | PSO | MV COM | K1A |
| 3 | TH | TH | HLO | TH | HLO | K1B |
| 4 | NC | Jumper to Pin 1 | MV Out | MV Out | MV Out | - |
| 5 | HLI | HLI | PSO | HLI | PSO | K2A |
| 6 | TR | TR | PSI | TR | PSI | K3A |
| 7 | MV Out | MV Out | FS | MV Out | FS | K3B |
| 8 | PSI | PSI | HLI | PSI | HLI | K4A |
| 9 | HLO | HLO | GND | HLO | GND | K4B |

FIG. 6 (Cont'd)

8 12-Pin: Goodman/Amana/Trane/American Standard/Lennox/Allied Air/York/Coleman/Luxaire Configuration

| # | DESCRIPTION |
|---|---|
| 1 | HIGH LIMIT OUT |
| 2 | FLAME SENSE IN |
| 3 | TRANSFORMER HIGH |
| 4 | PRESSURE SWITCH OUT |
| 5 | ROLLOUT SWITCH OUT |
| 6 | TRANSFORMER RETURN |
| 7 | HIGH LIMIT IN |
| 8 | CHASSIS GROUND |
| 9 | MAIN VALVE COMMON |
| 10 | PRESSURE SWITCH IN |
| 11 | ROLLOUT SWITCH IN |
| 12 | MAIN VALVE OUT |

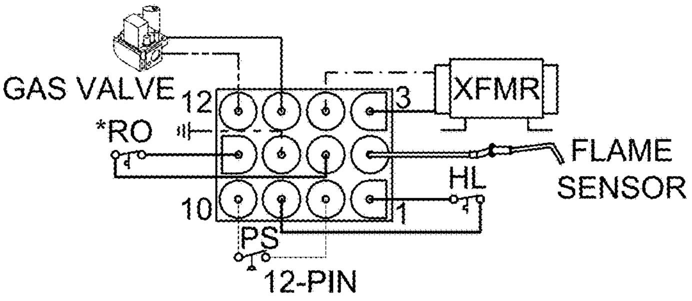

Note *: - Rollout switch not available on some Trane, American Standard, and York models
- See Application Notes for rollout input bypass instructions on these models
- Failure to configure rollout input correctly will result in rollout error code 12-Pin: Goodman Hybrid Configuration

| # | DESCRIPTION |
|---|---|
| 1 | HIGH LIMIT OUT |
| 2 | MAIN VALVE LOW OUT |
| 3 | TRANSFORMER HIGH |
| 4 | PRESSURE SWITCH OUT |
| 5 | ROLLOUT SWITCH OUT |
| 6 | TRANSFORMER RETURN |
| 7 | HIGH LIMIT IN |
| 8 | CHASSIS GROUND |
| 9 | MAIN VALVE COMMON |
| 10 | PRESSURE SWITCH IN |
| 11 | ROLLOUT SWITCH IN |
| 12 | MAIN VALVE HIGH OUT |

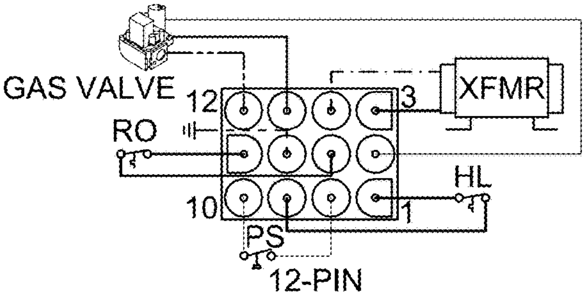

Relay configuration for pin 2&12 of 12-pin connector E23:

| Pin # | Furnace Side - Pinout 1 | Furnace Side - Pinout 2 | Control Side | | Relay |
|---|---|---|---|---|---|
| | WR Standard | Goodman Hybrid | Relay Off | Relay On | |
| 2 | FS | MV LO | MV LO | FS | K3B |
| 12 | MV OUT | MV HI | MV LO | NC | K2B |

A

FIG. 7

A 9 12-Socket: Lennox/Allied Air

| # | DESCRIPTION |
|---|---|
| 1 | HIGH LIMIT OUT |
| 2 | FLAME SENSE IN |
| 3 | TRANSFORMER HIGH |
| 4 | PRESSURE SWITCH OUT |
| 5 | ROLLOUT SWITCH OUT |
| 6 | TRANSFORMER RETURN |
| 7 | HIGH LIMIT IN |
| 8 | CHASSIS GROUND |
| 9 | MAIN VALVE COMMON |
| 10 | PRESSURE SWITCH IN |
| 11 | ROLLOUT SWITCH IN |
| 12 | MAIN VALVE OUT |

10 10-Pin Inline: Trane/American Standard

| # | DESCRIPTION |
|---|---|
| 1 | INDUCER LIMIT IN |
| 2 | TRANSFORMER RETURN |
| 3 | PRESSURE SWITCH IN |
| 4 | HIGH LIMIT OUT |
| 5 | MAIN VALVE COMMON |
| 6 | TRANSFORMER HIGH |
| 7 | CHASSIS GROUND |
| 8 | MAIN VALVE OUT |
| 9 | HIGH LIMIT IN |
| 10 | FLAME SENSE IN |

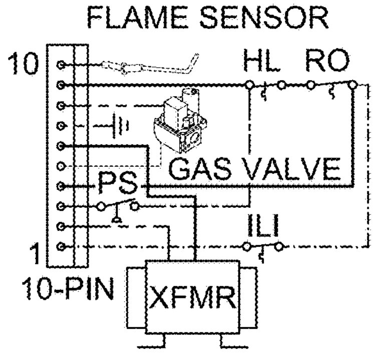

10-Pin Inline: Trane/American Standard Alt. Configuration

| # | DESCRIPTION |
|---|---|
| 1 | OPEN |
| 2 | TRANSFORMER RETURN |
| 3 | PRESSURE SWITCH IN |
| 4 | HIGH LIMIT OUT |
| 5 | MAIN VALVE COMMON |
| 6 | TRANSFORMER HIGH |
| 7 | CHASSIS GROUND |
| 8 | MAIN VALVE OUT |
| 9 | HIGH LIMIT IN |
| 10 | FLAME SENSE IN |

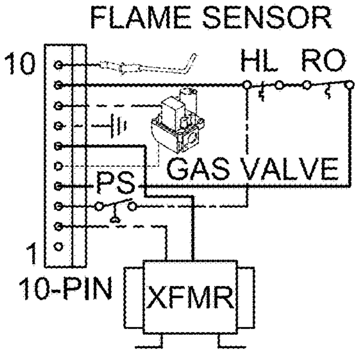

11 11-Pin Inline: Carrier/Bryant/Payne/ICP

| # | DESCRIPTION |
|---|---|
| 1 | FLAME SENSOR IN |
| 2 | PRESSURE OUT |
| 3 | (SEE 11 PIN DETAIL) |
| 4 | PRESSURE IN |
| 5 | GAS VALVE GND |
| 6 | LIMIT OUT |
| 7 | (SEE 11 PIN DETAIL) |
| 8 | LIMIT IN |
| 9 | (SEE 11 PIN DETAIL) |
| 10 | GAS VALVE OUT |
| 11 | (SEE 11 PIN DETAIL) |

11-Pin Detail: PIN 3 - Housing Pressure Switch Input

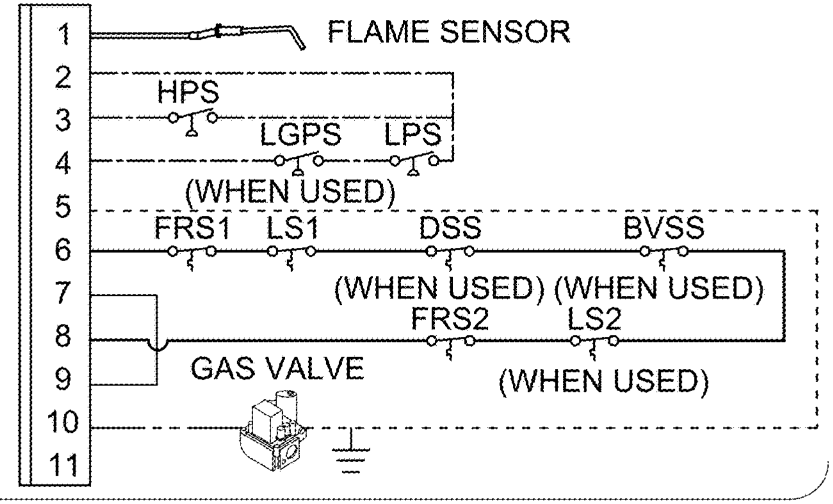

A

FIG. 8

The following is the connector details for E1 connector. This E1 connector is designed to support to different Harnesses; Harness A (for 50T35 Goodman Applications) and Harness B (for Nordyne, Rheem, Ruud Applications) -

Table 2: Harness A - E1 Connector Interface

| Pin | Signals |
|---|---|
| Pin 1 | NC |
| Pin 2 | PSO |
| Pin 3 | TH |
| Pin 4 | NC |
| Pin 5 | HLI |
| Pin 6 | TR |
| Pin 7 | MV OUT |
| Pin 8 | PSI |
| Pin 9 | HLO |

Table 3: Harness B - E1 Connector Interface

| Pin | Signals |
|---|---|
| Pin 1 | NC |
| Pin 2 | MV COM |
| Pin 3 | HLO |
| Pin 4 | MV OUT |
| Pin 5 | PSI |
| Pin 6 | PSO |
| Pin 7 | FS |
| Pin 8 | HLI |
| Pin 9 | GND |

FIG. 9

These are Standard WR Main Harness Connections. E23 will support the Lennox, Goodman Hybrid Applications. E27 will support Lennox Applications.

Table 4: Main Harness - E23 and E27 Connector Interface

| Pin | E23 - Signals | E27 - Signals |
|---|---|---|
| Pin 1 | HLO | HLO |
| Pin 2 | FS/MV LO | FS |
| Pin 3 | TH | TH |
| Pin 4 | PSO | PSO |
| Pin 5 | R/O OUT | R/O OUT |
| Pin 6 | TR | TR |
| Pin 7 | HLI | HLI |
| Pin 8 | GND | GND |
| Pin 9 | MV COM | MV COM |
| Pin 10 | PSI | PSI |
| Pin 11 | R/O IN | R/O IN |
| Pin 12 | MV LO/MV HI | MV LO |

FIG. 10

This E35 Connector Harness will support the Modern Carrier, ICP and ICM Applications.

Table 5: WR Main Harness - E35 Connector Interface

| Pin | Signals |
|---|---|
| Pin 1 | FS |
| Pin 2 | PSO |
| Pin 3 | C/PEOUT/HPS |
| Pin 4 | PSI |
| Pin 5 | MVCOM |
| Pin 6 | FRS&LS_OUT |
| Pin 7 | C/PE |
| Pin 8 | FRS&LS_IN |
| Pin 9 | MCU |
| Pin 10 | MV |
| Pin 11 | C/PEOUT |

FIG. 11

This E16 Connector Harness will support the Modern Trane Applications.

Table 6: Main Harness - E16 Connector Interface

| Pin | Signals |
|---|---|
| Pin 1 | ILI |
| Pin 2 | TR |
| Pin 3 | PSI |
| Pin 4 | HLO |
| Pin 5 | MVC |
| Pin 6 | TH |
| Pin 7 | GND |
| Pin 8 | MV LO |
| Pin 9 | HLI |
| Pin 10 | FS |

FIG. 12

Table 7: Harness D - E2 Connector Interface

| Pin | Signals |
|---|---|
| Pin 1 | IGN-H |
| Pin 2 | NC |
| Pin 3 | IND-N |
| Pin 4 | IND-H |
| Pin 5 | NC |
| Pin 6 | IGN-N |

Table 8: Harness H - E2 Connector Interface

| Pin | Signals |
|---|---|
| Pin 1 | IND-H |
| Pin 2 | NC |
| Pin 3 | IGN-H |
| Pin 4 | IND-N |
| Pin 5 | NC |
| Pin 6 | IGN-N |

FIG. 13

This 4-pin E25 connector is the WR Standard Ignitor and Inducer Connector to support most applications.

This E38 connector is designed to support different Controls.

Table 9: Harness C - E25 Connector Interface

| Pin | Signals |
|---|---|
| Pin 1 | IGN-H |
| Pin 2 | IND-H |
| Pin 3 | IGN-N |
| Pin 4 | IND-N |

Table 10: Harness G - E25 Connector Interface

| Pin | Signals |
|---|---|
| Pin 1 | IND-H |
| Pin 2 | IGN-H |
| Pin 3 | IND-N |
| Pin 4 | IGN-N |

FIG. 14

This 4-pin E38 connector is the WR Standard Ignitor and Inducer Connector to support Lennox applications. This E38 connector is designed to support different Trane's Controls.

Table 11: Harness C - E38 Connector Interface

| Pin | Signals |
|---|---|
| Pin 1 | IGN-H |
| Pin 2 | IND-H |
| Pin 3 | IGN-N |
| Pin 4 | IND-N |

Table 12: Harness G - E38 Connector Interface

| Pin | Signals |
|---|---|
| Pin 1 | IND-H |
| Pin 2 | IGN-H |
| Pin 3 | IND-N |
| Pin 4 | IGN-N |

FIG. 15

This 2-pin E36 connector is the WR Standard Ignitor and Inducer Connector to support Carrier, Goodman, Amana, ICM Applications. This E36 connector is designed to support to different Harnesses; Harness C (for Carrier Applications) and Harness G (for Goodman, Amana, ICM Applications) -

Table 13: Harness C - E36 Connector Interface

| Pin | Signals |
|---|---|
| Pin 1 | IGN-H |
| Pin 2 | IND-H |

Table 14: Harness G - E36 Connector Interface

| Pin | Signals |
|---|---|
| Pin 1 | IND-H |
| Pin 2 | IGN-H |

FIG. 16

HVAC CONTROL ASSEMBLIES AND CORRESPONDING METHODS OF CONFIGURING PINOUT OF CONNECTORS FOR HVAC CONTROL ASSEMBLIES

CROSS-REFERENCE TO RELATED APPLICATION

This application claims the benefit of and priority to U.S. Provisional Application No. 63/433,995 filed Dec. 20, 2022. The entire disclosure of the above application is incorporated herein by reference.

FIELD

The present disclosure generally relates to HVAC control assemblies (e.g., aftermarket universal replacement controls, etc.) and corresponding methods of configuring pinout of connectors for HVAC control assemblies.

BACKGROUND

This section provides background information related to the present disclosure which is not necessarily prior art.

Universal service heating, ventilation and air-conditioning (HVAC) control boards are used to control furnaces, air handlers, heat pumps, and air-conditioning units. Properly configuring most universal service HVAC control boards to match their original application generally requires manual intervention by an installer.

DRAWINGS

The drawings described herein are for illustrative purposes only of selected embodiments and not all possible implementations, and are not intended to limit the scope of the present disclosure.

FIGS. 4 through 8 illustrate example socket and pin connector configurations and relay configurations of various conventional HVAC controls that may be connectible with the corresponding connectors 1-12 on the HVAC control board of the HVAC control assembly shown in FIG. 3 according to exemplary embodiments of the present disclosure.

FIG. 9 includes tables of connector details (pin number and signals) for an E1 connector (e.g., 9-socket connector E1 shown in FIG. 6, etc.) configured to support different equipment wiring harnesses (e.g., 9-pin Harness A and Harness B E1 Connector Interface, etc.).

FIG. 10 includes a table of connector details (pin number and signals) for E23 and E27 connectors (e.g., 12-pin connector shown in FIG. 7, etc.) configured to support different equipment wiring harnesses (e.g., 12-pin Main Harness E23 and E27 Connector Interface, etc.).

FIG. 11 includes a table of connector details (pin number and signals) for an E35 connector (e.g., 11-pin connector shown in FIG. 8, etc.) configured to support different equipment wiring harnesses (e.g., 11-pin Main Harness E35 Connector Interface, etc.).

FIG. 12 includes a table of connector details (pin number and signals) for an E16 connector (e.g., 10-pin connector shown in FIG. 8, etc.) configured to support different equipment wiring harnesses (e.g., 10-pin Main Harness E16 Connector Interface, etc.).

FIG. 13 includes tables of connector details (pin number and signals) for an E2 connector (e.g., 6-socket connector E2 shown in FIG. 4, etc.) configured to support different equipment wiring harnesses (e.g., 6-pin Harness D and Harness H E2 Connector Interface, etc.).

FIG. 14 includes tables of connector details (pin number and signals) for an E25 connector (e.g., 4-pin connector E25 shown in FIG. 4, etc.) configured to support different equipment wiring harnesses (e.g., 4-pin Harness C and Harness G E25 Connector Interface, etc.).

FIG. 15 includes tables of connector details (pin number and signals) for an E38 connector configured to support different equipment wiring harnesses (e.g., 4-pin Harness C and Harness G E38 Connector Interface, etc.).

FIG. 16 includes tables of connector details (pin number and signals) for an E36 connector (e.g., 2-pin connector E36 shown in FIG. 5, etc.) configured to support different equipment wiring harnesses (e.g., 2-pin Harness C and Harness G E36 Connector Interface, etc.).

Figure 17:
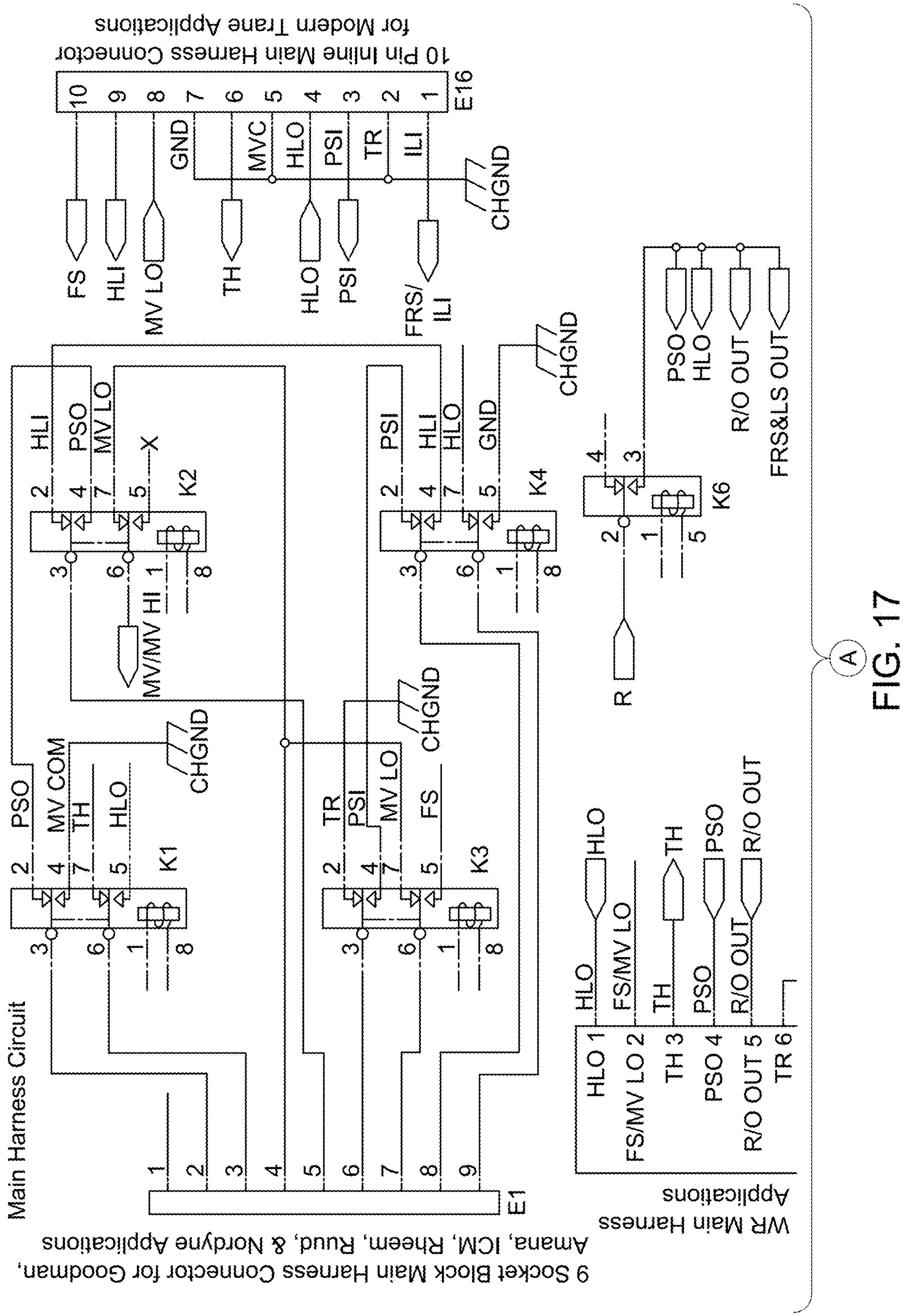
Figure 17:
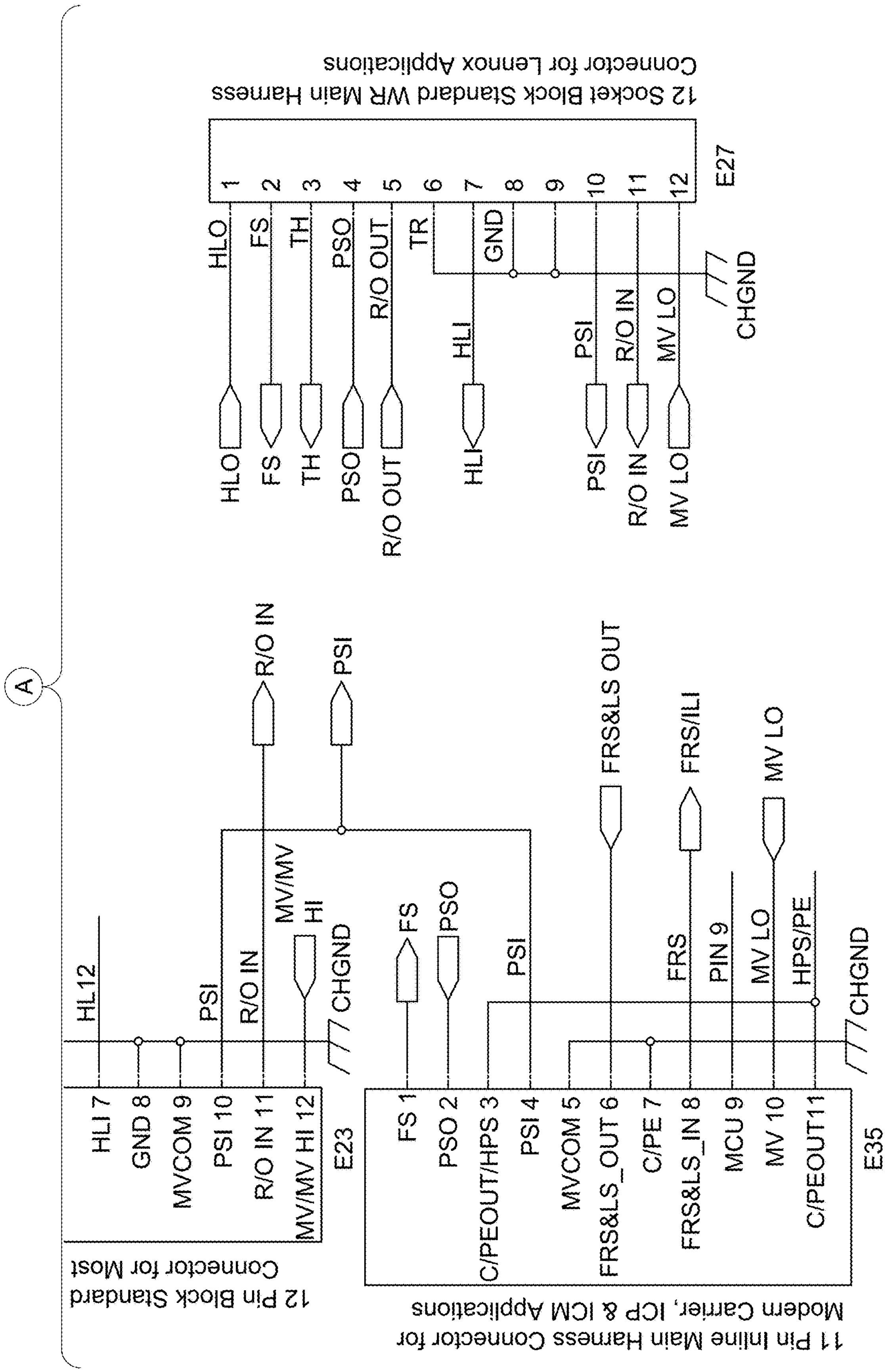

FIG. 17 is a wiring schematic of a main harness circuit of an HVAC control board including a plurality of main harness connectors and relays K1, K2, K3, K4, K6 according to an exemplary embodiment of the present disclosure. As shown, the plurality of main harness connectors includes a 9-socket block main harness connector (E1 connector interface), a 12-pin block main harness connector (E23 connector interface), an 11-pin inline main harness connector (E35 connector interface), a 10-pin inline main harness connector (E16 connector interface), and a 12-socket block main harness connector (E27 connector interface).

Figure 6:
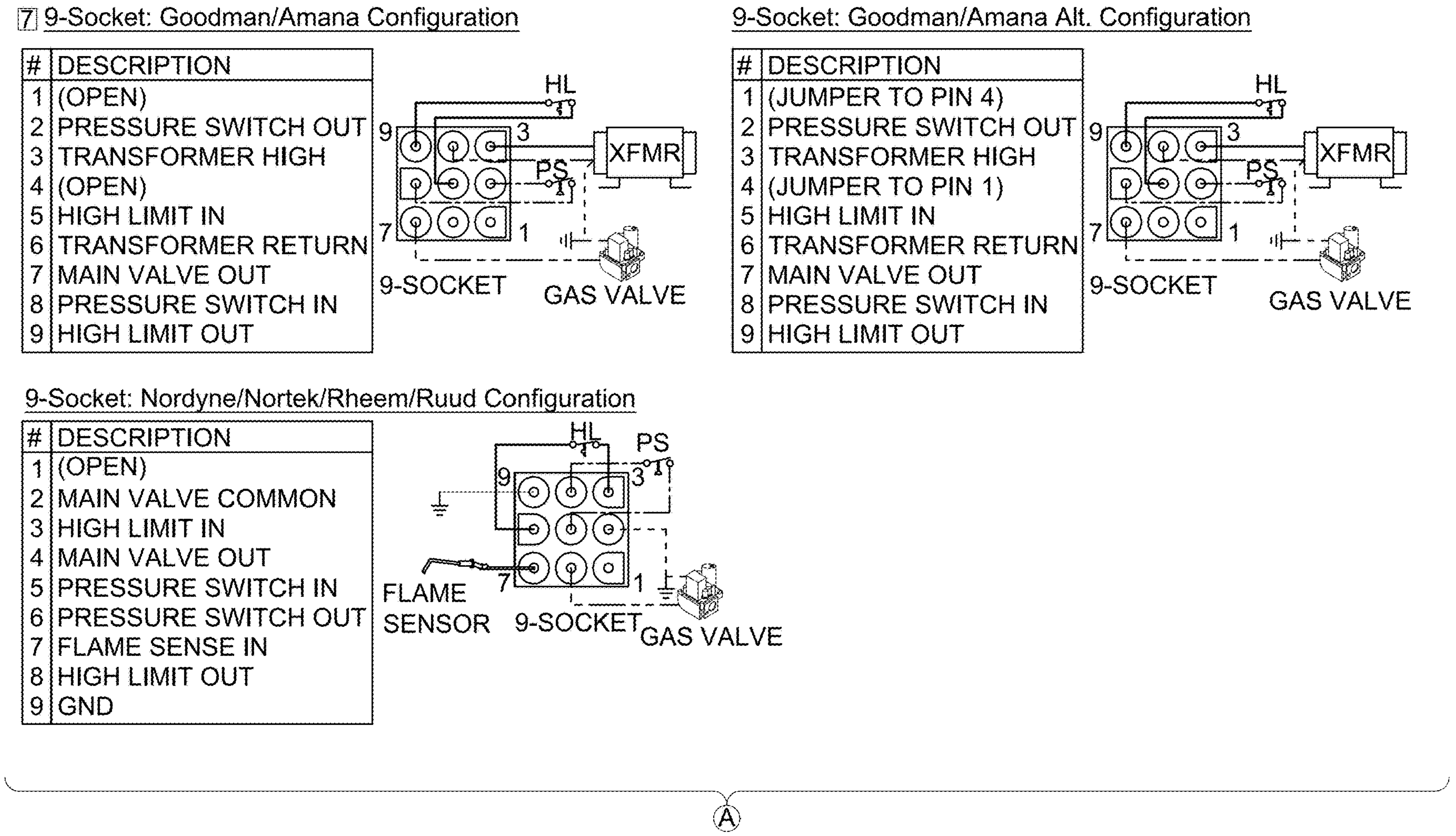
Figure 7:
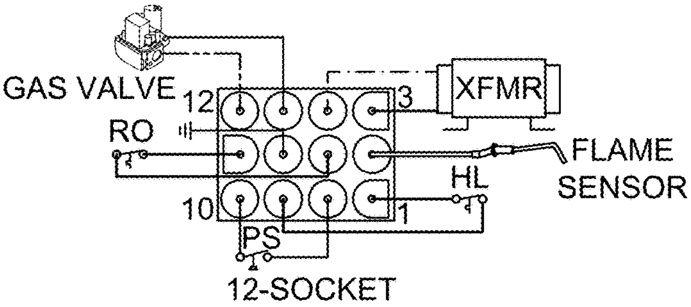
Figure 8:
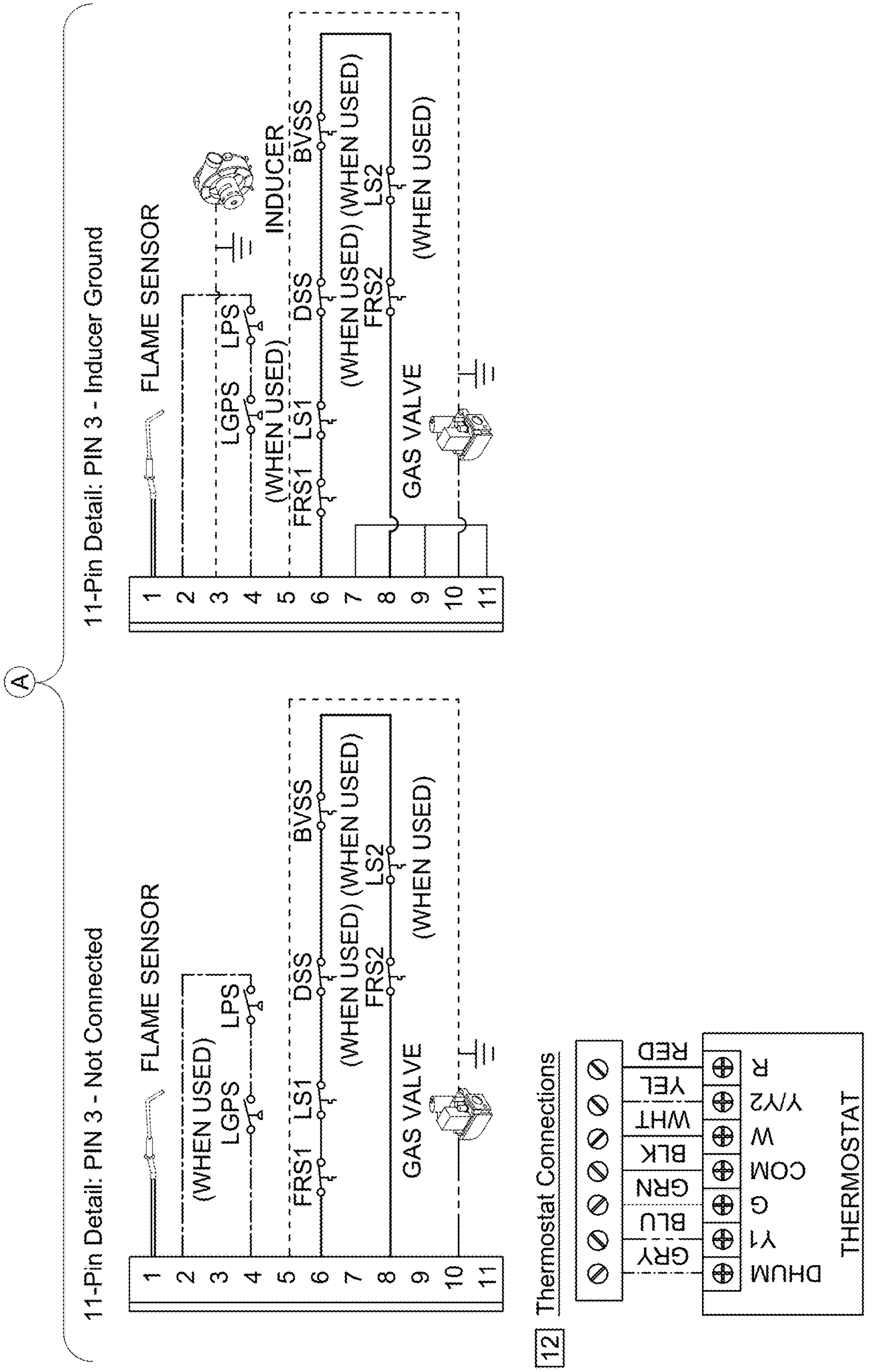

The 9-socket block main harness connector enables the HVAC control assembly to be used as a replacement for a conventional control including a 9-socket connector as shown in FIG. 6. The 12-pin block main harness connector enables the HVAC control assembly to be used as a replacement for a conventional control including a 12-pin connector as shown in FIG. 7. The 11-pin inline main harness connector enables the HVAC control assembly to be used as a replacement for a conventional control including an 11-pin inline connector as shown in FIG. 8. The 10-pin inline main harness connector enables the HVAC control assembly to be used as a replacement for a conventional control including a 10-pin inline connector as shown in FIG. 8. The 12-socket block main harness connector enables the HVAC control assembly to be used as a replacement for a conventional control including a 12-socket connector as shown in FIG. 7.

Figure 18:
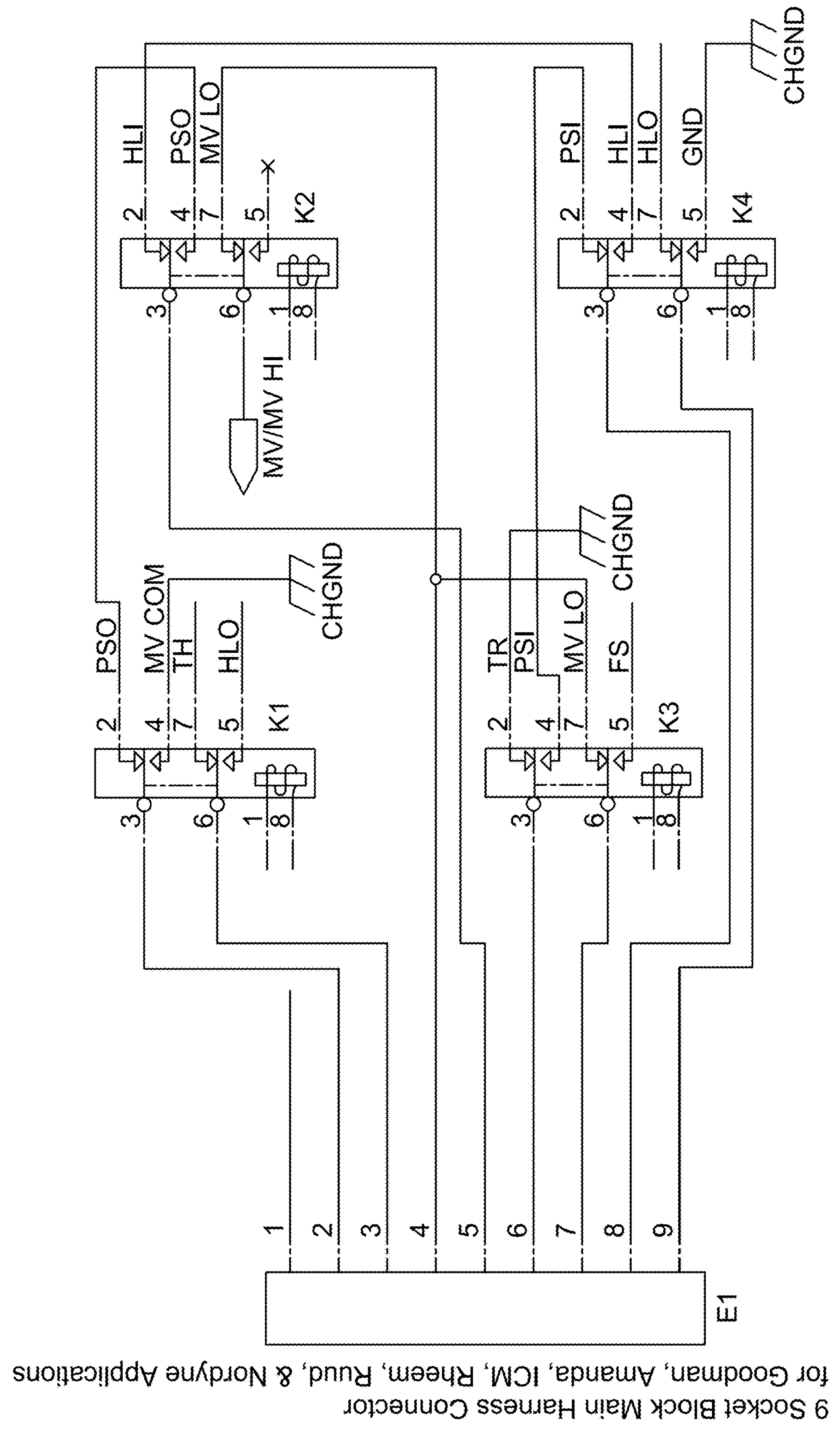

FIG. 18 is a wiring schematic of a portion of the main harness circuit of the HVAC control board shown in FIG. 17 including the 9-socket block main harness connector and relays K1, K2, K3, K4.

Figure 19:
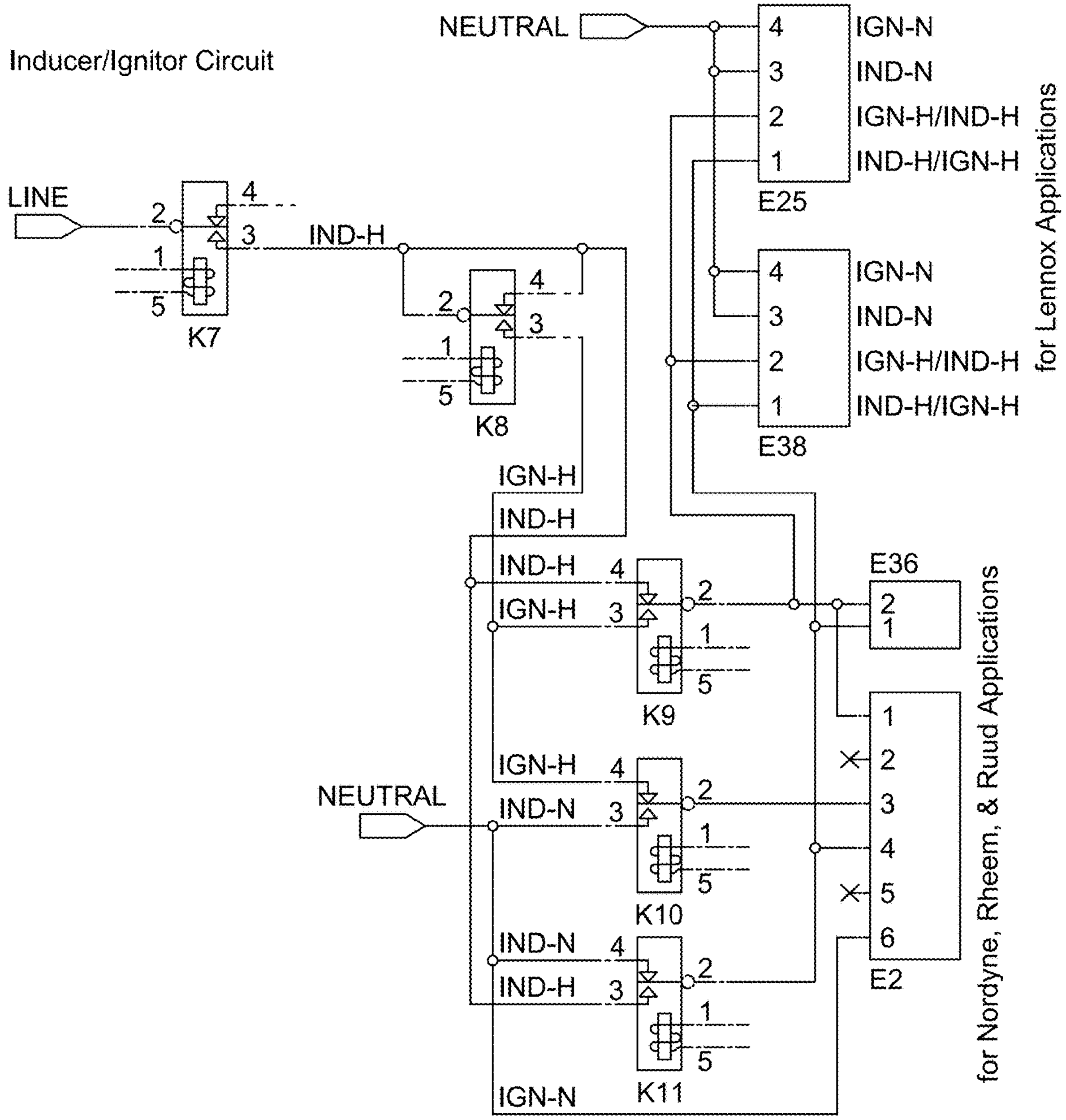

FIG. 19 is a wiring schematic of an inducer/igniter circuit of an HVAC control board including a plurality of connectors and relays K7, K8, K9, K10, and K11 according to an exemplary embodiment of the present disclosure. As shown, the plurality of connectors includes a 4-pin connector (E25 connector interface), a 4-pin connector (E38 connector interface), a 2-pin connector (E36 connector interface), and a 6-socket connector (E2 connector interface).

The 4-pin connector enables the HVAC control assembly to be used as a replacement for a conventional control including a 4-pin connector as shown in FIG. 4. The 2-pin connector enables the HVAC control assembly to be used as a replacement for a conventional control including a 2-pin connector as shown in FIG. 5. The 6-socket connector enables the HVAC control assembly to be used as a replacement for a conventional control including a 6-socket connector as shown in FIG. 4.

Figure 20:
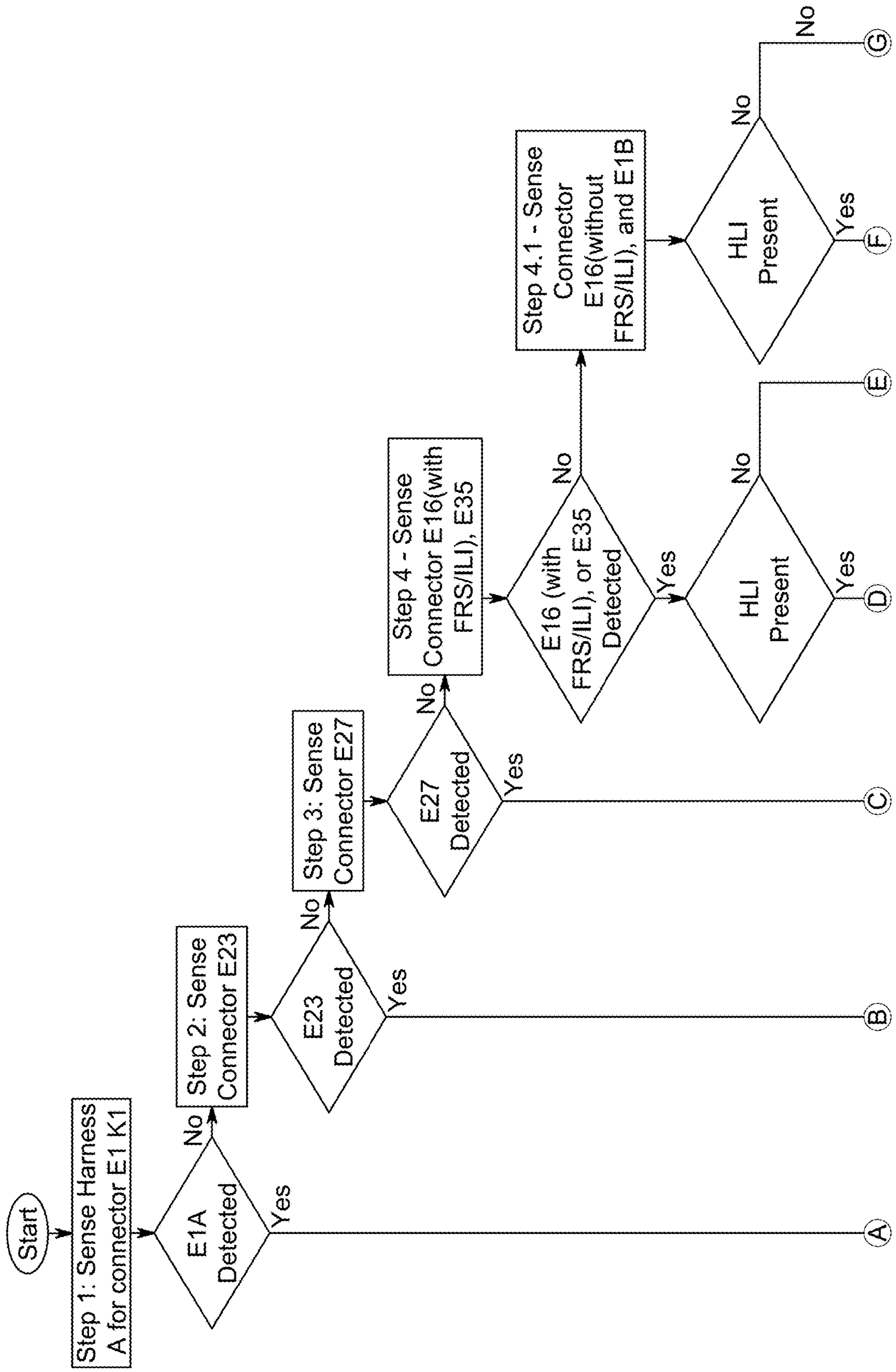
Figure 20:
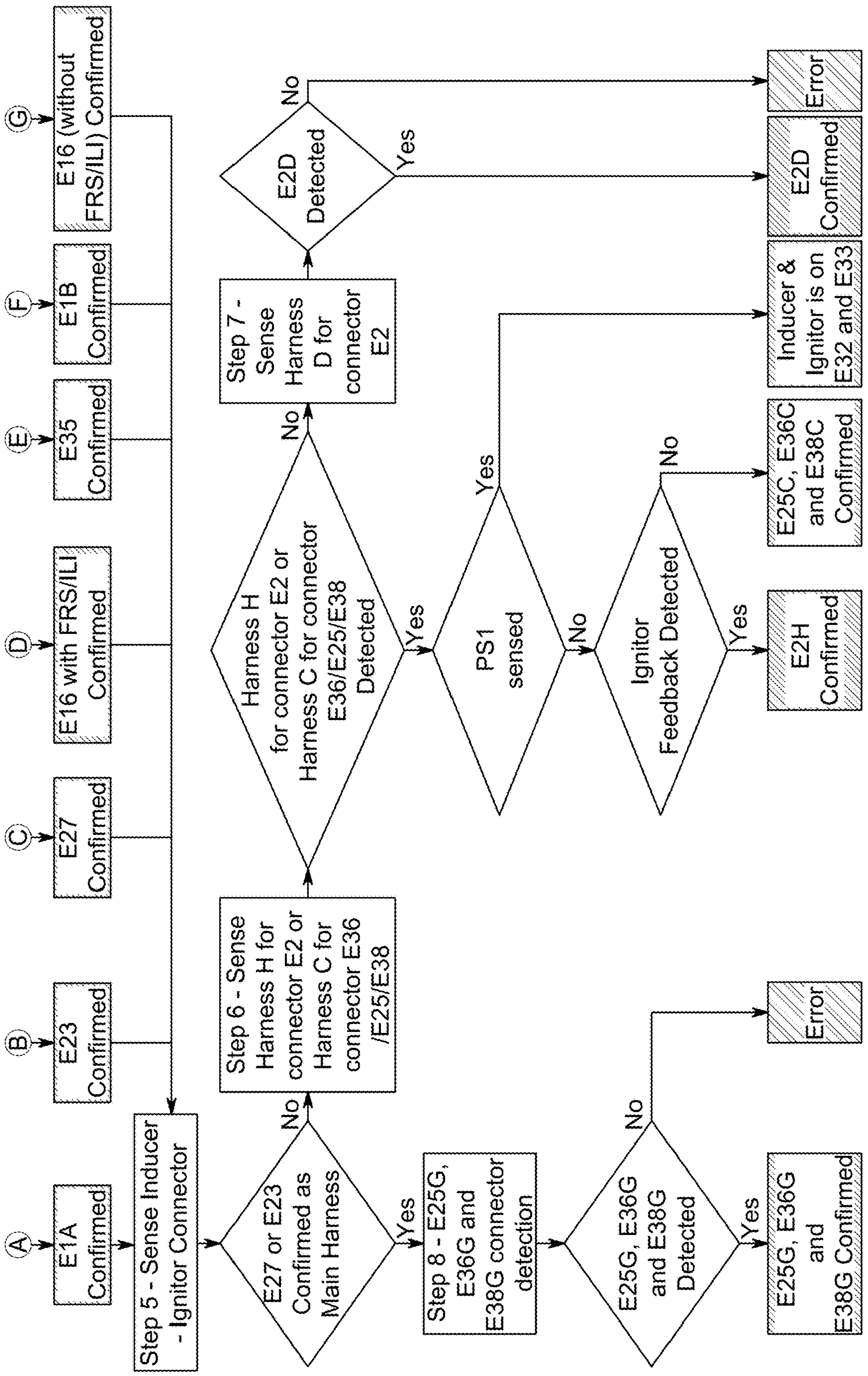

FIG. 20 is a process flow diagram of a method including auto configuration steps for harness detection according to an exemplary embodiment of the present disclosure. The auto configuration harness detection method may be used to check on which connector the main harness is connected, and on which connector the Inducer and Ignitor is connected.

Corresponding reference numerals may indicate corresponding (though not necessarily identical) parts throughout the several views of the drawings.

DETAILED DESCRIPTION

Example embodiments will now be described more fully with reference to the accompanying drawings.

Conventional connectors used for HVAC controls are commonly referred to as mate-n-lock connectors that include either pins or sockets. For example, a mate-n-lock connector may be configured inline for smaller pin counts from 2 to 6 pins as an array of pins, e.g., 3×2 (6 pins), 3×3 (9 pins), or 3×4 (12 pins). Various combination of these connectors have been used with different components connected to different pin numbers for the same connectors.

In exemplary embodiments disclosed herein, an HVAC control assembly includes multiple connectors (e.g., connectors 1-12 shown in FIG. 3, etc.) to cover the different pinouts of each model. The HVAC control assembly is configured to use relays to enable the HVAC control assembly to provide the needed options for what signals each connector pin needs to have inside the HVAC controller assembly. Exemplary embodiments may include configuring a connector to multiple discrete pinouts. Installation instructions may also be provided to guide an installer/contractor/technician as to which of the multiple connectors should be used for each different model.

Figure 2:
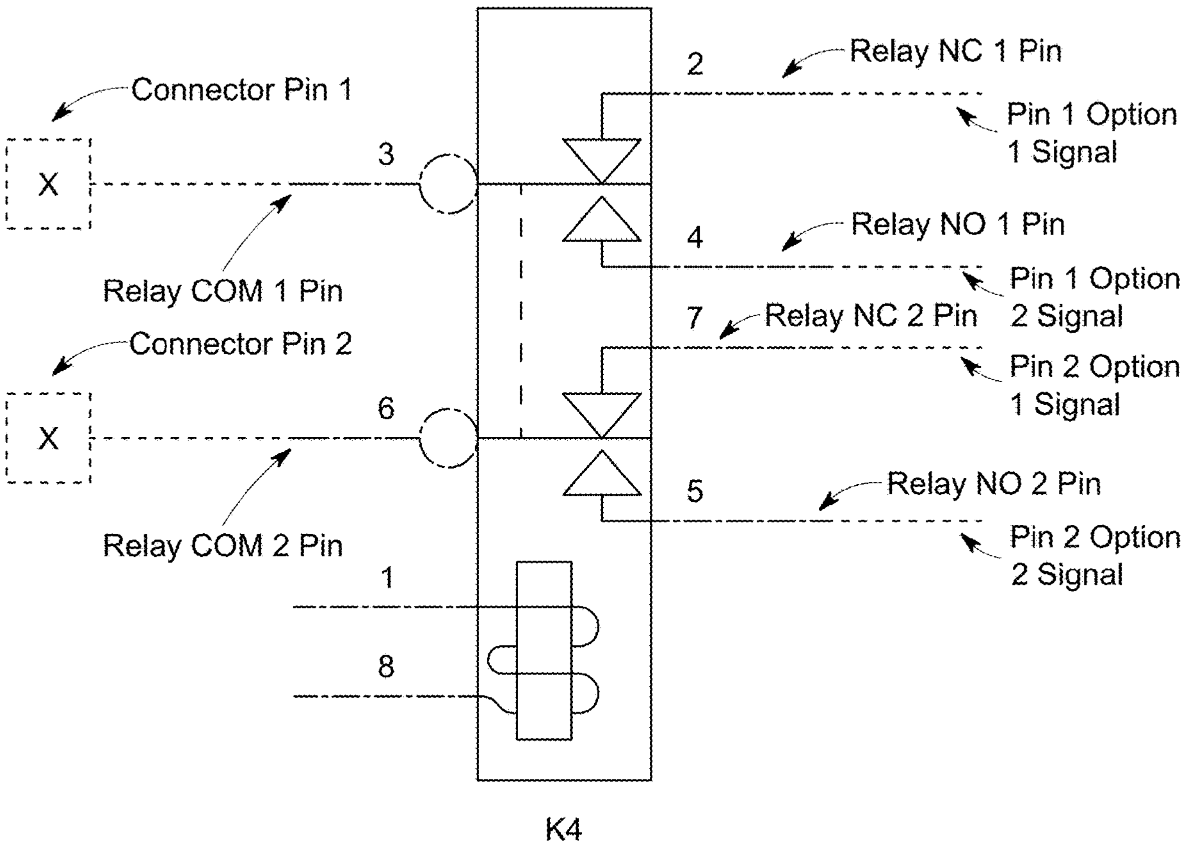
FIG. 2 is a block diagram illustrating one relay with two pairs of contacts of an HVAC control assembly according to an exemplary embodiment of the present disclosure.
Figure 3:
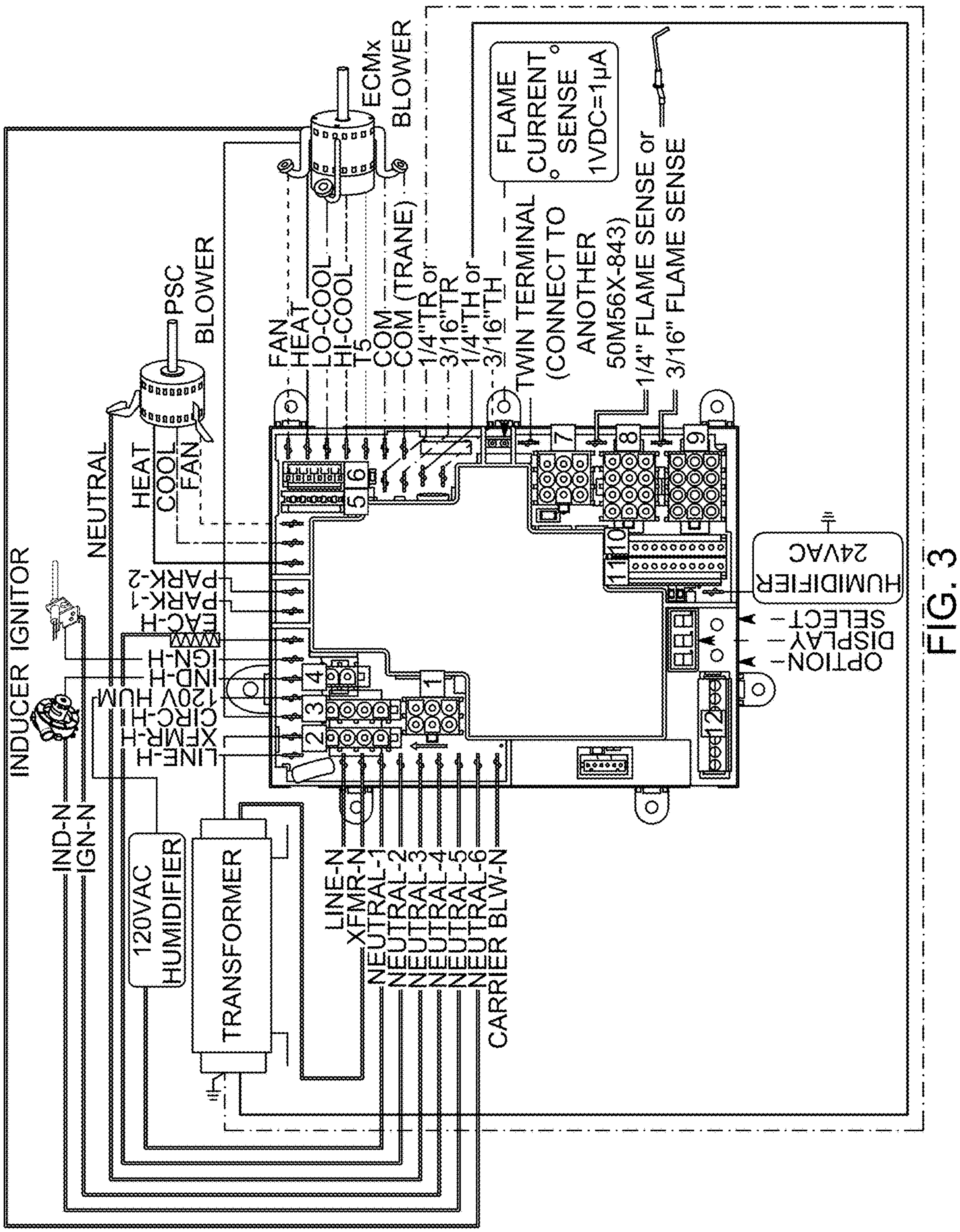
FIG. 3 is a wiring diagram of an HVAC control assembly according to an exemplary embodiment of the present disclosure.

As disclosed herein, exemplary embodiments are configured to use relays to change what is connected to a pin of a connector so more models of controls can be replaced with a single universal replacement control (e.g., HVAC control assembly shown in FIG. 3, etc.). For any one connector, there may generally be only two options, which two options often go together for groups of controls. In exemplary embodiments disclosed herein, an HVAC control assembly is configured to use a relay's Common (COM) pin to connect to a connector pin, which is referred to as Pin 1 in this example. If this pin 1 has an Option 1 or an Option 2 for signals, then the relay's Normally Closed (NC) pin could be connected to Option 1 and the relay's Normally Open (NO) pin could be connected to Option 2. When the relay is off and the NC pin is connected to common, Pin 1 of the connector is connected to Option 1. Likewise, when the relay is on and the NO pin is connected to common, Pin 1 of the connector is connected to Option 2. See, for example, FIG. 1. Two pins (Pin 1 and Pin 2) may follow and have two options together such that the number of relays can be reduced if a relay has two "poles" or two separate Common pins each having a corresponding NC and NO pin associated with them. See, for example, FIG. 2.

Figure 1:
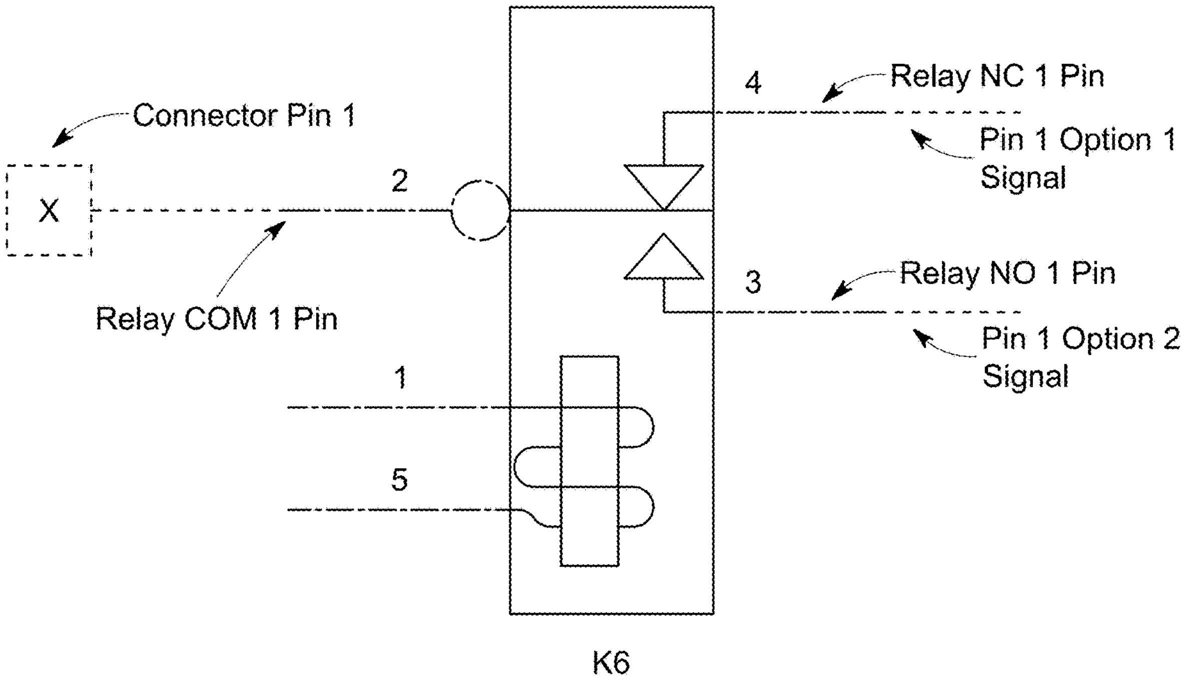
FIG. 1 is a block diagram illustrating an example of one relay with one pair of contacts of an HVAC control assembly according to an exemplary embodiment of the present disclosure.

FIG. 1 illustrates an example of one relay with one pair of contacts of an HVAC control assembly according to an exemplary embodiment of the present disclosure. The HVAC control assembly may be configured to be operable for using the relay to route connections on the HVAC control board between the connectors and the circuitry as a function of the selected OEM system. The relay will configure the circuitry to operate the connected components correctly as a function of the OEM system that is selected, e.g., selection via an app on a mobile device, selection made through an onboard menu, etc.

FIG. 2 illustrates one relay with two pairs of contacts of an HVAC control assembly according to an exemplary embodiment of the present disclosure. The HVAC control assembly may be configured to be operable for using the relay to route connections on the HVAC control board between the connectors and the circuitry as a function of the selected OEM system. The relay will configure the circuitry to operate the connected components correctly as a function of the OEM system that is selected, e.g., selection via an app on a mobile device, selection made through an onboard menu, etc.

FIG. 3 is a wiring diagram of an HVAC control assembly according to an exemplary embodiment of the present disclosure. As shown, the HVAC control assembly includes twelve different connectors 1-12 on the HVAC control board for connection with different controls having connectors with different pinouts. In this example, the connectors 1-12 on the HVAC control board shown in FIG. 3 may be configured to be connectible with the corresponding connector configurations 1-12 of different conventional HVAC controls shown in FIGS. 4 through 8. Accordingly, the HVAC control assembly includes multiple connectors to cover the different pinouts of each model. The HVAC control assembly is configured to use relays to enable the HVAC control assembly to provide the needed options for what signals each connector pin needs to have inside the HVAC control assembly. Installation instructions may also be provided to guide an installer/contractor/technician as to which of the multiple connectors should be used for each different model.

Properly matching OEM wiring harness connectors with the connectors of the HVAC control assembly shown in FIG. 3 may include one or more of the following steps or considerations:

- Identify connector type in OEM harness or on the OEM control and plug OEM wiring directly onto matching connector of the HVAC control assembly;
- No adapter harnesses are necessary, remove previously installed adapter harnesses if present;
- Take extra care with connectors that are visually similar such as connector pairs 2 & 3, 5 & 6, 8 & 9, and 10 & 11;
- Black connectors on HVAC control assembly contain sockets (which mate with harnesses containing pins);
- White connectors on HVAC control assembly contain pins (which mate with harnesses containing sockets);
- White & black connectors on HVAC control assembly may mate with different colored harness connectors;
- For connector pair 2 & 3: connector 2 is white indicating pins, and connector 3 is black indicating sockets;
- For connector pair 5 & 6: connector 5 does not have a latch, and connector 6 does have a latch;
- For connector pair 8 & 9: connector 8 is white indicating pins, and connector 9 is black indicating sockets;
- For connector pair 10 & 11: connector 10 has 10 pins, and connector 11 has 11 pins; and Match OEM connector to proper pin number.

In exemplary embodiments, the HVAC control assembly may be configured to be operable with an automatic configuration process during which the HVAC control assembly automatically configures its functional operation (including connector pinouts and certain menu options) to match that of the OEM furnace and control being replaced across a variety of applications. The automatic configuration process may allow for plug and play wiring of multiple OEM harnesses with different pinouts into a connector (e.g., the same physical connector, etc.) on the HVAC control board, and thus eliminates the need for adapter harnesses. The automatic configuration process may takes approximately 30 seconds at first power up and be allowed to complete to ensure proper operation. Most settings listed in the Configuration Menu table may remain user configurable and in their default state and may require further adjustment to match that of the OEM control.

During the automatic configuration process, the HVAC control assembly is able to configure for specific OEM applications and harness pinouts by detecting differences in OEM wiring and which loads are present on specific connector terminals. By way of example, the system wiring should match one of the scenarios outlined in the wiring diagrams shown in FIGS. 4-8, and all system components (such as inducer motors and pressure switches) should be operating properly prior to initiating the automatic configuration. Automatic configuration preferably occurs during the first power up and is verified at the next power up. After the same application is detected two consecutive times, the corresponding configuration may be written to memory and automatic configuration may no longer occur at power up. After being stored, the saved automatic configuration may later be cleared, e.g., using a menu option 5 (CHC). If an automatic configuration error code (E41) is reported, it should be verified that all wiring connections are correct and that all components in the system are present and functioning properly before power cycling the control and attempting another automatic configuration process. A single valid automatic configuration may preferably be sufficient to proceed with control installation and verification testing.

By way of example, an HVAC control assembly disclosed herein may be configured to be operable with an automatic configuration process as disclosed in Appendix A and/or as illustrated in FIG. 20. The contents of Appendix A is incorporated herein by reference in its entirety. In exemplary embodiments, the HVAC control assembly is able to detect which connector is coupled with an equipment wiring harness and may automatically set certain features and functionality of the relays to configure the pinout of the connector without installer intervention. In exemplary embodiments, the auto configuration harness detection method shown in FIG. 20 and/or Appendix A may be used to check on which connector the main harness is connected, and on which connector the Inducer and Ignitor is connected.

Exemplary embodiments of HVAC control assemblies disclosed herein can replace many different controls without the need for harness conversion kits or the need to re-wire the appliance by changing the connectors and/or how they are connected. In exemplary embodiments, the HVAC control assembly may be configurable with the menus via pushbuttons and seven segment displays.

FIGS. 4 through 8 illustrate example socket and pin connector configurations and relay configurations of various conventional HVAC controls that may be connectible with the corresponding connectors 1-12 on the HVAC control board of the HVAC control assembly shown in FIG. 3 according to exemplary embodiments of the present disclosure. The detailed wiring diagrams for connectors 1-12 shown in FIGS. 4-8 are only representative of the general interconnection between control inputs and outputs (e.g., PSI & PSO) and system components (e.g., pressure switch). OEMs often place multiple limit devices and pressure switches in series, such that OEM wiring diagrams should be referenced for additional information. Wire colors may not match all systems. Accordingly, FIGS. 4-8 are provided as examples only as exemplary embodiments of the HVAC control assemblies disclosed herein may apply to less or more connectors and options for replacing OEM controls than what is shown in FIGS. 4-8.

In exemplary embodiments, the HVAC control assembly is configured to be operable for using at least one relay with a common, a normally closed and a normally open (NCNO) to change what a pin is connected to. The HVAC control assembly may be configured to be operable for using a double pole version of the relay to switch two pins to two other components when both of these change commonly between models.

Advantageously, exemplary embodiments disclosed herein allow the use of one "universal" control that will replace many controls in the field without having adapter harnesses and without having to change connections by either moving wires in connectors or by crimping new/different terminals. For example, exemplary embodiments may allow for the removal of eight adapter harnesses from an existing single stage universal control, thereby eliminating the supplier costs to purchase the eight adapter harnesses. Oftentimes, most of the eight adapter harnesses would not be used in any given installation case and are discarded.

By way of example, an HVAC control assembly may be configured to be operable with and/or include one or more features as disclosed in the Installation Instructions included herewith as Appendix B. The contents of Appendix B is incorporated herein by reference in its entirety. Accordingly, exemplary embodiments may include an HVAC control assembly including connectors on the HVAC control board that are configured for connection (as shown in FIG. 3 and on page 7 of Appendix B) based on the existing control board of the furnace system that is being replaced. But exemplary embodiments disclosed herein are not limited to the specific configuration shown in Appendix B. Exemplary embodiments disclosed herein may also be applicable and usable with other controls where the pinout of a connector needs to be different in order to be compatible with OEM systems. For example, exemplary embodiments disclosed herein may be configured for use and/or applied to only one connector to cover a smaller number of models or to more connectors to cover even more models.

In exemplary embodiments, the HVAC control assembly comprises an aftermarket universal replacement control for single stage furnace applications with PSC or ECMx (constant torque) blower motors. A 120V ignitor may be included to replace ignitors in most furnaces as well as upgrade 80V systems to 120V. With the exemplary HVAC control assemblies disclosed herein, no complex adapter harnesses are required as all connectors and terminals (e.g., FIGS. 4-8, etc.) used in the major OEM brands are included on the HVAC control assembly itself. This allows for OEM wiring to be connected directly to the HVAC control assembly for a faster and easier installation.

In exemplary embodiments, the HVAC control assembly is configured for use as a universal replacement ignition control that includes different connectors on the panel assembly for the different harness configurations that might be plugged into the HVAC control assembly. With the different connectors for the different harness configurations, a particular harness may thus be plugged into the connectors in which the particular harness fits. Advantageously, this eliminates the need or requirement for providing or shipping multiple wiring harnesses along with the universal replacement ignition control. In contrast, conventional "universal" ignition products have several wire harnesses in the box so that a contractor/installer can connect the existing furnace components to the new control by choosing the correct harness and then discarding the unused harnesses.

Accordingly, disclosed are exemplary embodiments of HVAC control assemblies that are usable as a universal single stage integrated furnace control that combine the functionality and cross-reference base of existing universal single stage controls for permanent split capacitor (PSC) motor furnaces and electronically commutated motor (ECMx) furnaces. In contrast to the conventional products, exemplary embodiments disclosed herein do not require a contractor/installer to identify and install a wiring adapter harness in between the OEM furnace wiring and the control. This greatly simplifies the installation experience and reduces the cost and waste associated with shipping several harnesses with each product, most of which go unused. Additionally, exemplary embodiments disclosed herein provide a plethora of configuration options so the installer/contractor/technician can choose the settings that match the control being replaced exactly instead of choosing the closest option from a limited number of options via dipswitch or shunt jumper. Exemplary embodiments disclosed herein can be configured using pushbuttons and menus on the 7-segment display, or by utilizing built-in wireless capabilities (e.g., Near Field Communication (NFC), BLUETOOTH, Wi-Fi, etc.) and the App on a smartphone or other mobile device.

In addition, universal controls service many different OEM furnaces and therefore must be configured correctly for each one. The myriad of configuration options allows a significant amount of human error to be introduced into the setup process for a replacement universal control.

For example, properly configuring most universal service HVAC control boards (e.g., furnace control boards, air handler control boards, heat pump control boards, air-conditioning control boards, etc.) to match their original application can require manual intervention by an installer. Many control boards include dipswitches, jumpers, push-buttons, etc., for configuring certain control parameters (e.g., blower time delays, etc.), or selecting the original equipment manufacturer (OEM) brand the board is installed with, so that additional software timings, etc., and other features are correctly set. And dipswitches, etc. may be incorrectly set by an installer through human error, the installer may simply forget to set a feature, etc. This may result in improper operation of a unit, a return service call, etc. Therefore, moving as many configuration processes as possible into an automated process (e.g., automatic algorithm, etc.) built into the control firmware not only eliminates the human error possibility but also makes the process faster and easier for the technician/installer/contractor.

In addition, gas furnaces have evolved utilizing a variety of different inputs and outputs to monitor their safe and efficient operations. Each revision creates a different set of limit switches to monitor, along with different wiring and connector configurations that a universal control must accommodate. One example would be that of a roll out switch. Many OEMs place the flame rollout switch in series with other limit switches, such as the high limit switch. Other OEMs directly monitor the rollout switch on a dedicated input. A universal control must accommodate either scenario thus the onus is often placed on the installer to bypass the rollout inputs on controls where they are not used to avoid the control throwing an error code, which prevents proper functioning. In the field, this is a nuanced detail that is easy to overlook during installation and can lead to confusion and frustration. On the other hand, if the specific applications that require such a configuration can be detected by the control and changed automatically there would then be one less thing to go wrong.

In exemplary embodiments disclosed herein, an HVAC control assembly is configured to be operable for using or analyzing inputs and outputs connected to the HVAC control assembly to identify differences in the wiring connections present in the furnace application in which the HVAC control assembly is installed. Identifying differences in the wiring connections may be achieved in a variety of ways or methods. For example, identifying differences in the wiring connections may include interpreting differences in the signals observed on the low voltage wiring that vary based on the type of device or wiring configuration connected to that pin on the connector. Or, for example, identifying differences in the wiring connections may include a trial-and-error approach by attempting to run an output (e.g., an inducer motor, etc.) and monitoring for a corresponding input (e.g., a pressure switch closing, etc.) on a given pin in the main harness. These methods may be combined together, e.g., using conditional logic in the control's firmware that allows many OEM applications to be differentiated from each other without installer intervention. This automatic configuration process preferably occurs on initial power up of the control and preferably is subsequently stored in memory. Understanding the OEM application allows for certain settings to be automatically configured, such as connector pinout, certain delay timings, menu options, and other settings. In addition to automatic configuration, manual configuration via a menu on the control or a companion App on a smartphone or other mobile device may also be used in exemplary embodiments.

In exemplary embodiments disclosed herein, an HVAC control assembly is wirelessly configurable via a smartphone or other mobile device using a short-range wireless communication interface (e.g., BLUETOOTH (BT), Near Field Communication (NFC), Wi-Fi, etc.). An installer may use a software application (App) on a smartphone or other mobile device to configure such an HVAC control assembly. The HVAC control assembly may include an HVAC control board including at least one interface connector. The HVAC control assembly may be configured to be operable for configuring the same/single interface connector to multiple discrete pinouts. This allows the HVAC control assembly to be usable as a replacement for different existing HVAC controls having different pinout configurations. For example, the HVAC control assembly may include a single interface connector on a panel assembly. The wiring inputs from the harness/connector are configurable using relays, which are part of the panel assembly. The relays may be set (open/closed) via an App on a smartphone or other mobile device. This may be generally similar to manually using dip switches to set the state of the relays. In this exemplary embodiment, the App is usable for wirelessly communicating with the HVAC control assembly via Bluetooth and/or NFC communication, etc. to wirelessly configure the state of the relays.

In exemplary embodiments, the HVAC control assembly include a controller (e.g., microcontroller, etc.) that is configured to determine (e.g., automatically without manual intervention, etc.) which original equipment manufacturer (OEM) system is connected to an interface connector on the HVAC control board. In exemplary embodiments, the HVAC control assembly is configured to be operable for monitoring control input/output (I/O) and specific signals in conjunction with differences in OEM wiring, component, and conditional trial and error logic to automatically detect an OEM furnace application and configure the HVAC control assembly accordingly.

Described herein are exemplary embodiments of HVAC control assemblies including HVAC control boards having at least one main system interface connector. The HVAC control assembly is able to configure for specific OEM applications and harness pinouts by detecting differences in OEM wiring and which loads are present on specific connector terminals. The HVAC control assembly may automatically configure certain settings, features and functionality without installer intervention, such as connector pinout, certain delay timings, menu options, and other settings.

Advantageously, exemplary embodiments enable various configuration processes to be implemented via an automated process (e.g., automatic algorithm, etc.) built into the control firmware that not only eliminates the human error possibility but also makes the process faster and easier for the technician/installer/contractor. As disclosed herein, exemplary embodiments may be configured to differentiate many OEM applications from each other without installer intervention. Understanding the OEM application allows for certain settings to be automatically configured, such as connector pinout, certain delay timings, menu options, and other settings.

In addition, exemplary embodiments may also allow for the use of one "universal" control that will replace many controls in the field without requiring adapter harnesses and without requiring changes to connections by either moving wires in connectors or by crimping new/different terminals. For example, exemplary embodiments may allow for the removal of eight adapter harnesses from an existing single stage universal control, thereby eliminating the supplier costs to purchase the eight adapter harnesses. Oftentimes, most of the eight adapter harnesses would not be used in any given installation case and are discarded.

In exemplary embodiments, the HVAC control assembly may be configured for use as a universal replacement ignition control operable for configuring the same/single interface connector to multiple discrete pinouts. Advantageously, this eliminates the need or requirement for providing or shipping multiple wiring harnesses along with the universal replacement ignition control. In contrast, conventional "universal" ignition products have several wire harnesses in the box so that a contractor/installer can connect the existing furnace components to the new control by choosing the correct harness and then discarding the unused harnesses.

In exemplary embodiments, the HVAC control assembly is usable as a universal single stage integrated furnace control that combine the functionality and cross-reference base of existing universal single stage controls for permanent split capacitor (PSC) motor furnaces and electronically commutated motor (ECMx) furnaces. In contrast to the conventional products, exemplary embodiments disclosed herein do not require a contractor/installer/technician to identify and install a wiring adapter harness in between the OEM furnace wiring and the control. This greatly simplifies the installation experience and reduces the cost and waste associated with shipping several harnesses with each product, most of which go unused.

In exemplary embodiments, an HVAC control assembly comprises an HVAC control board including a plurality of relays and a plurality of interface connectors configured to cover different pinouts of interface connectors for different existing HVAC controls. An HVAC controller is configured to use the relays to configure pinout of the plurality of connectors of the HVAC control assembly.

In exemplary embodiments, the HVAC controller is configured to use the relays to provide needed options for what signals each connector pin needs to have inside the HVAC control assembly.

In exemplary embodiments, the plurality of connectors includes: at least a first interface connector disposed on the HVAC control board, the first interface connector having multiple pins or multiple sockets configured with a first pinout configuration; and at least a second interface connector disposed on the HVAC control board, the second interface connector having multiple pins or multiple sockets configured with a second pinout configuration different than the first pinout configuration. The HVAC control assembly is usable as a replacement for a first existing HVAC control having the first pinout configuration and as a replacement for a second existing HVAC control having the second pinout configuration.

In exemplary embodiments, the HVAC controller is configured to be operable for automatically configuring pinout of the plurality of connectors of the HVAC control assembly.

In exemplary embodiments, the plurality of connectors includes: at least one interface connector having a total number of multiple pins different than a total number of multiple pins of at least one other interface connector; and/or at least one interface connector having a total number of sockets different than a total number of multiple sockets of at least one other interface connector; and/or at least one interface connector including multiple pins inline or in an array having multiple rows of pins; and/or at least one interface connector including multiple sockets inline or in an array having multiple rows of sockets.

In exemplary embodiments, the plurality of connectors comprises one or more of: a 6-socket connector having six sockets positioned in a 3×2 interface connector arrangement having three rows of two sockets each; a 4-pin connector having four pins inline; a 4-socket connector having four sockets inline; a 2-pin connector; a 6-pin connector having six pins inline; a 9-socket connector having nine sockets positioned in a 3×3 interface connector arrangement having three rows of three sockets each; a 12-pin connector having twelve pins positioned in a 3×4 interface connector arrangement having three rows of four pins each; a 12-socket connector having twelve sockets positioned in a 3×4 interface connector arrangement having three rows of four sockets each; a 10-pin connector having ten pins inline; an 11-pin connector having eleven pins inline; and a thermostat connector including thermostat connections.

In exemplary embodiments, the HVAC controller is configured to automatically determine which of the plurality of interface connectors is connected with a wiring harness.

In exemplary embodiments, the HVAC control board comprises an aftermarket control board capable of replacing an existing control board in multiple different original equipment manufacturer HVAC systems.

In exemplary embodiments, an HVAC system includes an HVAC control assembly as disclosed herein.

In exemplary embodiments, a method comprises replacing an existing controller of an original equipment manufacturer HVAC system with an HVAC control assembly as disclosed herein.

In exemplary embodiments, an HVAC control assembly comprises an HVAC control board including at least one interface connector. An HVAC controller is configured to be operable for determining automatically which original equipment manufacturer (OEM) system is connected to the at least one interface connector. In response to the determination of which original equipment manufacturer (OEM) system is connected to the at least one interface connector, the HVAC controller is operable for automatically configuring one or more settings of the HVAC control assembly.

In exemplary embodiments, the HVAC control assembly is configured to be operable for analyzing inputs and outputs connected to the HVAC control assembly to identify differences in wiring connections present in a furnace application in which the HVAC control assembly is installed.

In exemplary embodiments, the HVAC control assembly is configured to be operable for identifying differences in wiring connections present in a furnace application in which the HVAC control assembly is installed by: interpreting differences in signals observed on the low voltage wiring that vary based on the type of device or wiring configuration connected to that pin on the at least one connector of the HVAC control assembly; and/or a trial-and-error approach by attempting to run an output, such as an inducer, and monitoring for a corresponding input, such as a pressure switch closing, on a given pin in a main harness of the HVAC control assembly.

In exemplary embodiments, the HVAC control assembly is configured to be operable for performing both interpreting differences in signals observed on the low voltage wiring and the trial-and-error approach by using conditional logic in the HVAC control assembly's firmware to thereby allow OEM applications to be differentiated from each other without installer intervention.

In exemplary embodiments, the HVAC control assembly is configured to be operable for performing the automatic configuration process on initial power up.

In exemplary embodiments, the HVAC control assembly is configured to be operable for: monitoring control input/output (I/O) and specific signals in conjunction with differences in OEM wiring, component, and conditional trial and error logic to automatically detect an OEM furnace application; and automatically configuring one or more settings of the HVAC control assembly in response to the automatic detection of the OEM furnace application.

In exemplary embodiments, the HVAC controller is operable for automatically configuring one or more of a connector pinout, a delay timing, and a menu option in response to the determination of which original equipment manufacturer (OEM) system is connected to the at least one interface connector.

In exemplary embodiments, the HVAC controller is configured to automatically determine without manual intervention which of a plurality of original equipment manufacturer (OEM) systems is connected to the at least one interface connector.

In exemplary embodiments, the HVAC control board comprises an aftermarket control board capable of replacing an existing control board in multiple different original equipment manufacturer HVAC systems.

In exemplary embodiments, an HVAC system includes an HVAC control assembly as disclosed herein.

In exemplary embodiments, a method comprises replacing an existing controller of an original equipment manufacturer HVAC system with an HVAC control assembly as disclosed herein.

In exemplary embodiments, a method comprising automatically configuring one or more settings of an HVAC control assembly as disclosed herein in response to automatic detection of which original equipment manufacturer (OEM) system is connected to the at least one interface connector.

In exemplary embodiments, a method comprises: determining automatically, via an HVAC control assembly, which original equipment manufacturer (OEM) system is connected to at least one interface connector of the HVAC control assembly; and automatically configuring one or more settings of the HVAC control assembly in response to the determination of which original equipment manufacturer (OEM) system is connected to the at least one interface connector of the HVAC control assembly.

In exemplary embodiments, the method includes analyzing inputs and outputs connected to the HVAC control assembly to identify differences in wiring connections present in a furnace application in which the HVAC control assembly is installed.

In exemplary embodiments, the method includes identifying differences in wiring connections present in a furnace application in which the HVAC control assembly is installed by: interpreting differences in signals observed on the low voltage wiring that vary based on the type of device or wiring configuration connected to that pin on the at least one connector of the HVAC control assembly; and/or a trial-and-error approach by attempting to run an output, such as an inducer, and monitoring for a corresponding input, such as a pressure switch closing, on a given pin in a main harness of the HVAC control assembly.

In exemplary embodiments, the method includes performing both interpreting differences in signals observed on the low voltage wiring and the trial-and-error approach by using conditional logic in the HVAC control assembly's firmware to thereby allow OEM applications to be differentiated from each other without installer intervention.

In exemplary embodiments, the method includes performing the automatic configuration process on initial power up.

In exemplary embodiments, the method includes: monitoring control input/output (I/O) and specific signals in conjunction with differences in OEM wiring, component, and conditional trial and error logic to automatically detect an OEM furnace application; and automatically configuring one or more settings of the HVAC control assembly in response to the automatic detection of the OEM furnace application.

In exemplary embodiments, the method includes automatically configuring one or more of a connector pinout, a delay timing, and a menu option of the HVAC control assembly in response to the determination of which original equipment manufacturer (OEM) system is connected to the at least one interface connector of the HVAC control assembly.

In exemplary embodiments, the method includes automatically determining without manual intervention which of a plurality of original equipment manufacturer (OEM) systems is connected to the at least one interface connector of the HVAC control assembly.

In exemplary embodiments, the HVAC control assembly comprises an aftermarket controller capable of replacing an existing controller in multiple different original equipment manufacturer HVAC systems.

In exemplary embodiments, the method includes replacing an existing controller of an original equipment manufacturer HVAC system with the HVAC control assembly.

Exemplary embodiments are disclosed of methods for automatically detecting on which connector a main harness is connected and on which connector an inducer and ignitor is connected. In exemplary embodiments, the method comprises the following steps:

(1) sensing Harness A for connector E1:
 - if the Harness A is detected on the connector E1, the method proceeds to step (5); or
 - if the Harness A is not detected on the connector E1, the method proceeds to step (2);

(2) sensing the Harness A for connector E23:
 - if the Harness A is detected on the connector E23, the method proceeds to step (5); or
 - if the Harness A is not detected on the connector E23, the method proceeds to step (3);

(3) sensing the Harness A for connector E27:
 - if the Harness A is detected on the connector E27, the method proceeds to step (5); or
 - if the Harness A is not detected on the connector E27, the method proceeds to step (4);

(4) sensing the Harness A for connector E16 or connector E35:
 - if the Harness A is detected on the connector E16 or the connector E35, the method proceeds to step (5); or
 - if the Harness A is not detected on the connector E16 or the connector E35, the method proceeds to step (4.1); or (4.1) sensing the Harness A for the connector E16 or connector E1B to detect whether the Harness A is on the connector E16 or the connector E1B, and the method proceeds to step (5);

(5) sensing inducer-ignitor connector:
 - if the connector E27 or the connector E23 is detected for a main harness, an inducer-ignitor harness is connected and the method proceeds to step (8); or
 - if any other main connector is detected for the Harness A, the method proceeds to step (6);

(6) sensing Harness H for connector E2 or Harness C for connector E36, connector E25, and connector E38;

(7) sensing Harness D for the connector E2;

(8) detecting connector E25G, connector E36G, and connector E38G; and (9) end auto configuration if the detected main harness and inducer and ignitor harness pair does not match a pre-defined mapping, which is indicative of an error in detecting either main harness or the inducer and ignitor harness.

In exemplary embodiments, the step (1) sensing Harness A for connector E1 when Harness A is in use includes checking interrupt request (IRQ) status:
 - if IRQ signal is lost, then Harness A is sensed on E1 connector and configuration for the main harness is complete, and the method proceeds to step (5) to sense the connector on E2 connector; or
 - if IRQ signal is present, then Harness A is not senses on the E1 connector, and the method proceeds to step (2).

In exemplary embodiments, the step (4.1) sensing the Harness A for the connector E16 or connector E1B to detect whether the Harness A is on the connector E16 or the connector E1B includes checking high level interface (HLI) signal status:
 - if the HLI signal is detected, the connector E1B is in use and the method proceeds to step (5); or
 - if the HLI signal is not detected, the connector E16 is in use and the method proceeds to step (5).

In exemplary embodiments, the method for automatically detecting on which connector a main harness is connected and on which connector an inducer and ignitor is connected. In exemplary embodiments, the method comprises steps as disclosed in Appendix A and/or as illustrated in FIG. 20.

For example, FIG. 20 illustrates an exemplary method for automatically detecting on which connector a main harness is connected and on which connector an inducer and ignitor is connected. As shown in FIG. 20, the method includes Step 1: sense Harness A for connector E1 K1.

If E1A (Harness A on connector E1) is detected and confirmed at Step 1, the method proceeds to Step 5: Sense Inducer-Ignitor Connector. If E1A is not detected at Step 1, the method proceeds to Step 2: Sense connector E23.

If E23 is detected and confirmed at Step 2, the method proceeds to Step 5: Sense Inducer-Ignitor Connector. If E23 is not detected at Step 2, the method proceeds to Step 3: Sense Connector E27.

If E27 is detected and confirmed at Step 3, the method proceeds to Step 5: Sense Inducer-Ignitor Connector. If E27 is not detected at Step 3, the method proceeds to Step 4: Sense Connector E16 (with safety switch string input (FRS/ILI)), E35. The safety switch string input may comprise flame rollout, high limit, etc.

If E16 (with safety switch string input (FRS/ILI)) or E35 is detected at Step 4, the method proceeds to determine if HLI is present. If HLI is present, E16 with RFS/ILI is confirmed and the method proceeds to Step 5. If HLI is not present, E35 is confirmed and the method and the method proceeds to Step 5.

If neither E16 (with safety switch string input (FRS/ILI)) nor E35 is detected at Step 4, the method proceeds to Step 4.1—Sense Connector (without safety switch string input (FRS/ILI)) and E1B. If HLI is present at Step 4.1, E1B (Harness B on connector E1) is confirmed and the method proceeds to Step 5. If HLI is not present at Step 4.1, E16 (without safety switch string input (FRS/ILI)) is confirmed and the method proceeds to Step 5.

At Step 5: Sense Inducer-Ignitor Connector, the method confirms whether E27 or E23 for the main harness. If E27 or E23 is confirmed as main harness at Step 5, then method proceeds to Step 8—E25G, E36G, and 38G connector detection. If E27 or E23 is not confirmed as main harness at Step 5, then method proceeds to Step 6—Sense Harness H for connector E2 or Harness C for connector E36/E25/E38.

If the Harness H for connector E2 or Harness C for connector E36/E25/E38 is detected at Step 6, then the method includes sensing pressure switch input (PSI). If pressure switch input (PSI) is sensed, the Inducer & Ignitor is on E23 and E33. If pressure switch input (PSI) is not sensed, the method includes detecting ignitor feedback. If ignitor feedback is detected, then E2H (Harness H on connector E2) is confirmed. If ignitor feedback is not detected, then E25C, 36C, and E38C are confirmed (Harness C on connectors E25, E36, E38).

But if the Harness H for connector E2 or Harness C for connector E36/E25/E38 is not detected at Step 6, then the method proceeds to Step 7—Sense Harness D for connector E2. If E2D is detected at Step 7, then E2D is confirmed (Harness D on connector E2). If E2D is not detected at Step 7, there is an error or fault condition.

Step 8 includes E25G, E36G, and 38G connector detection. If E25G, E36G, and E38G are detected at Step 8, then E25G, E36G, and E38 are confirmed for the main harness. If E25G, E36G, and E38 are not detected at Step 8, there is an error or fault condition.

In exemplary embodiments, the method may further include a Step 9 that ends the auto configuration method if the detected main harness and inducer and ignitor harness pair does not match a pre-defined mapping, which is indicative of an error in detecting either the main harness or the inducer and ignitor harness.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An HVAC control assembly comprising:

an HVAC control board including a plurality of relays and a plurality of interface connectors, each interface connector having connector pins configured to mate directly with original equipment manufacturer (OEM) wiring harnesses having different pinout configurations, each relay including at least a common contact selectively connectable to a normally-open contact or a normally-closed contact; and an HVAC controller configured to:

electrically couple a given connector pin, via the common contact of a respective relay, selectively to a first internal HVAC control signal or a second internal HVAC control signal corresponding to different OEM pinout configurations;

automatically determine which OEM wiring harness is connected to a selected interface connector by sensing at least one electrical characteristic of a connected load or input; and automatically control the relays to physically reconfigure signal routing to the connector pins to match the determined OEM pinout configuration;

wherein for at least one interface connector pin, the common contact of a corresponding relay is directly electrically connected to the interface connector pin, and the normally-open contact and the normally-closed contact of the relay are connected to the first internal HVAC control signal and the second internal HVAC control signal respectively.

2. The HVAC control assembly of claim 1, wherein the HVAC controller is configured to use the relays to provide needed options for what signals each connector pin needs to have inside the HVAC control assembly.

3. The HVAC control assembly of claim 1, wherein the plurality of interface connectors includes:
at least a first interface connector disposed on the HVAC control board, the first interface connector having multiple pins or multiple sockets configured with a first pinout configuration; and
at least a second interface connector disposed on the HVAC control board, the second interface connector having multiple pins or multiple sockets configured with a second pinout configuration different than the first pinout configuration;
whereby the HVAC control assembly is usable as a replacement for a first existing HVAC control having the first pinout configuration and as a replacement for a second existing HVAC control having the second pinout configuration.

4. The HVAC control assembly of claim 1, wherein the HVAC controller is configured to be operable for automatically configuring pinout of the plurality of interface connectors of the HVAC control assembly, without installer intervention, by actuating the plurality of relays to alter physical electrical connections between internal control circuitry and connector pins.

5. The HVAC control assembly of claim 1, wherein the plurality of interface connectors includes:
at least one interface connector having a total number of multiple pins different than a total number of multiple pins of at least one other interface connector; and/or
at least one interface connector having a total number of sockets different than a total number of multiple sockets of at least one other interface connector; and/or
at least one interface connector including multiple pins inline or in an array having multiple rows of pins; and/or
at least one interface connector including multiple sockets inline or in an array having multiple rows of sockets.

6. The HVAC control assembly of claim 1, wherein the plurality of interface connectors includes at least one interface connector having a total number of multiple pins different than a total number of multiple pins of at least one other interface connector.

7. The HVAC control assembly of claim 1, wherein the plurality of interface connectors includes at least one interface connector having a total number of sockets different than a total number of multiple sockets of at least one other interface connector.

8. The HVAC control assembly of claim 1, wherein the plurality of interface connectors includes at least one interface connector including multiple pins inline or in an array having multiple rows of pins.

9. The HVAC control assembly of claim 1, wherein the plurality of interface connectors includes at least one interface connector including multiple sockets inline or in an array having multiple rows of sockets.

10. The HVAC control assembly of claim 1, wherein the plurality of interface connectors comprises one or more of:
a 6-socket connector having six sockets positioned in a 3×2 interface connector arrangement having three rows of two sockets each;
a 4-pin connector having four pins inline;
a 4-socket connector having four sockets inline;
a 2-pin connector;
a 6-pin connector having six pins inline;
a 9-socket connector having nine sockets positioned in a 3×3 interface connector arrangement having three rows of three sockets each;
a 12-pin connector having twelve pins positioned in a 3×4 interface connector arrangement having three rows of four pins each;
a 12-socket connector having twelve sockets positioned in a 3×4 interface connector arrangement having three rows of four sockets each;
a 10-pin connector having ten pins inline;
an 11-pin connector having eleven pins inline; and
a thermostat connector including thermostat connections.

11. The HVAC control assembly of claim 1, wherein the HVAC controller is configured to automatically determine which of the plurality of interface connectors is connected with a wiring harness by detecting at least one of:
a presence or absence of an expected input signal;
a detected electrical load characteristic; or
a response of a controlled output to a commanded operation.

12. The HVAC control assembly of claim 1, wherein the HVAC control board comprises an aftermarket control board capable of replacing an existing control board in multiple different original equipment manufacturer HVAC systems.

13. The HVAC control assembly of claim 1, wherein actuation of the relay changes a functional identity of the interface connector pin between two different OEM-specific signal definitions.

14. The HVAC control assembly of claim 1, wherein:
upon detection of a valid OEM wiring configuration, the HVAC controller stores the corresponding relay configuration in non-volatile memory; and/or
automatic pinout configuration is inhibited on subsequent power-ups unless the stored configuration is cleared.

15. The HVAC control assembly of claim 1, wherein the interface connectors comprise mate-and-lock connectors configured for direct mating with furnace wiring harnesses carrying line-voltage and control-voltage signals.

16. An HVAC control assembly comprising:
an HVAC control board including a plurality of relays and a plurality of interface connectors, each interface connector having connector pins configured to mate directly with original equipment manufacturer (OEM) wiring harnesses having different pinout configurations, each relay including at least a common contact selectively connectable to a normally-open contact or a normally-closed contact; and
an HVAC controller configured to:
electrically couple a given connector pin, via the common contact of a respective relay, selectively to a first internal HVAC control signal or a second internal HVAC control signal corresponding to different OEM pinout configurations;
automatically determine which OEM wiring harness is connected to a selected interface connector by sensing at least one electrical characteristic of a connected load or input; and
automatically control the relays to physically reconfigure signal routing to the connector pins to match the determined OEM pinout configuration;
wherein automatically determining which OEM wiring harness is connected includes detecting a response of a pressure switch input to actuation of an inducer output.

17. The HVAC control assembly of claim 16, wherein failure to detect the response causes the HVAC controller to change relay states and retest until a valid OEM pinout configuration is confirmed.

18. An HVAC control assembly comprising:

an HVAC control board including a plurality of relays and a plurality of interface connectors, each interface connector having connector pins configured to mate directly with original equipment manufacturer (OEM) wiring harnesses having different pinout configurations, each relay including at least a common contact selectively connectable to a normally-open contact or a normally-closed contact; and an HVAC controller configured to:

electrically couple a given connector pin, via the common contact of a respective relay, selectively to a first internal HVAC control signal or a second internal HVAC control signal corresponding to different OEM pinout configurations;

automatically determine which OEM wiring harness is connected to a selected interface connector by sensing at least one electrical characteristic of a connected load or input; and automatically control the relays to physically reconfigure signal routing to the connector pins to match the determined OEM pinout configuration;

wherein the interface connectors are configured to receive OEM wiring harnesses without use of adapter harnesses or rewiring of connector terminals.

19. The HVAC control assembly of claim 18, wherein for at least one interface connector pin, the common contact of a corresponding relay is directly electrically connected to the interface connector pin, and the normally-open contact and the normally-closed contact of the relay are connected to the first internal HVAC control signal and the second internal HVAC control signal respectively.

20. The HVAC control assembly of claim 18, wherein elimination of adapter harnesses is achieved by relay-based reassignment of connector pin signal functions.

* * * * *